(12) United States Patent
Yang et al.

(10) Patent No.: US 8,811,153 B1
(45) Date of Patent: Aug. 19, 2014

(54) SWITCH FABRIC FOR NETWORK DEVICES

(75) Inventors: Chih-Kong Ken Yang, Pacific Palisades, CA (US); Robert James Drost, Los Altos, CA (US); Sunay Tripathi, Palo Alto, CA (US)

(73) Assignee: Pluribus Networks Inc., Palo Alto, CA (US)

( * ) Notice: Subject to any disclaimer, the term of this patent is extended or adjusted under 35 U.S.C. 154(b) by 427 days.

(21) Appl. No.: 13/100,125

(22) Filed: May 3, 2011

Related U.S. Application Data

(60) Provisional application No. 61/330,758, filed on May 3, 2010, provisional application No. 61/346,138, filed on May 19, 2010.

(51) Int. Cl.
*G08C 15/00* (2006.01)
(52) U.S. Cl.
USPC .......................................... 370/218
(58) Field of Classification Search
USPC .................. 370/217, 218, 360, 386
See application file for complete search history.

(56) References Cited

U.S. PATENT DOCUMENTS

| | | | |
|---|---|---|---|
| 7,937,101 B2 * | 5/2011 | Corke et al. | 455/516 |
| 8,374,175 B2 * | 2/2013 | Riley | 370/386 |
| 8,396,053 B2 * | 3/2013 | Giles et al. | 370/352 |

* cited by examiner

*Primary Examiner* — Chandrahas Patel
(74) *Attorney, Agent, or Firm* — Martine Penilla Group, LLP

(57) ABSTRACT

In general, in one aspect, the invention relates to a network device, including: an input port; an output port; a switch fabric including a primary fabric, an auxiliary fabric, and a controller; and a distributor configured to obtain, from the input port, a first data unit, provide the first data unit to the primary fabric, determine, after the first data unit is transmitted to the primary fabric, that the primary fabric is congested, send, in response to determining that the primary fabric is congested, a request to the controller to establish a data path through the auxiliary fabric, obtain, from the input port and after sending the request, a second data unit, provide the second data unit to the auxiliary fabric, where the auxiliary fabric transmits the second data unit to the aggregator through the data path in the auxiliary fabric.

14 Claims, 14 Drawing Sheets

SWITCH FABRIC FOR NETWORK DEVICES

CROSS-REFERENCE TO RELATED APPLICATIONS

This application claims benefit under 35 U.S.C. §119(e) to U.S. Provisional Application Ser. No. 61/330,758 entitled "VIRTUAL NETWORKS" filed on May 3, 2010. U.S. Provisional Application Ser. No. 61/330,758 is hereby incorporated by referenced in its entirety.

This application claims benefit under 35 U.S.C. §119(e) to U.S. Provisional Application Ser. No. 61/346,138 entitled "NETWORK SWITCH" filed on May 19, 2010. U.S. Provisional Application Ser. No. 61/346,138 is hereby incorporated by referenced in its entirety.

BACKGROUND

Network devices transmit data within or between networks. One such type of network device is a switch. A switch includes ingress ports configured to receive data, egress ports to transmit data, and a switch fabric connecting the ingress ports to the egress ports. Conventional switch fabrics include only limited functionality to manage the flow of data through the switch fabric. As a result, the switch fabric may become congested, which in-turn, degrades the performance of the network in which the switch is located.

SUMMARY

In general, in one aspect, the invention relates to a network device, including: an input port; an output port; a switch fabric including a primary fabric, an auxiliary fabric, and a controller; a distributor configured to obtain, from the input port, a first data unit, provide the first data unit to the primary fabric, where the primary fabric transmits the first data unit to an aggregator through a first data path in the primary fabric, determine, after the first data unit is transmitted to the primary fabric, that the primary fabric is congested, send, in response to determining that the primary fabric is congested, a request to the controller to establish a second data path through the auxiliary fabric, obtain, from the input port and after sending the request, a second data unit, provide the second data unit to the auxiliary fabric, where the auxiliary fabric transmits the second data unit to the aggregator through the second data path in the auxiliary fabric; the controller configured to receive the request to establish the second data path, and establish, in response to the request, the second data path in the auxiliary fabric; and the aggregator configured to receive the first data unit from the primary fabric and provide the first data unit to the output port, and receive the second data unit from the auxiliary fabric and provide the second data unit to the output port.

In general, in one aspect, the invention relates to a network device, including: an input port; an output port; a switch fabric including a primary fabric, an auxiliary fabric, and a controller; a distributor configured to obtain, from the input port, a first data unit, provide the first data unit to the primary fabric, where the primary fabric transmits the first data unit to an aggregator through a first data path in the primary fabric, determine, after the first data unit is transmitted to the primary fabric, that a congestion threshold associated with the input port is exceeded, send, in response to determining that the congestion threshold is exceeded, a request to the controller to establish a second data path through the auxiliary fabric, obtain, from the input port and after sending the request, a second data unit, provide the second data unit to the auxiliary fabric, where the auxiliary fabric transmits the second data unit to the aggregator through the second data path in the auxiliary fabric; the controller configured to establish, in response to the request, the second data path through the auxiliary fabric; and the aggregator configured to receive the first data unit from the primary fabric and provide the first data unit to the output port, and receive the second data unit from the auxiliary fabric and provide the second data unit to the output port.

In general, in one aspect, the invention relates to a system for transmitting data. The system includes: an input port; an output port; a switch fabric including a primary fabric, an auxiliary fabric, and a controller; a distributor configured to obtain, from the input port, a first data unit, provide the first data unit to the primary fabric, where the primary fabric transmits the first data unit to an aggregator through a first data path in the primary fabric, obtain, from the input port after the first data unit is transmitted to the primary fabric, a second data unit, provide the second data unit to the auxiliary fabric, where the auxiliary fabric transmits the second data unit to the aggregator through the second data path in the auxiliary fabric; a transmission module configured to determine that the primary fabric is congested, send, in response to determining that the primary fabric is congested, a request to the controller to establish a second data path through the auxiliary fabric; the controller configured to receive the request to establish the second data path, and establish, in response to the request, the second data path through the auxiliary fabric; and the aggregator configured to receive the first data unit from the primary fabric and provide the first data unit to the output port, and receive the second data unit from the auxiliary fabric and provide the second data unit to the output port.

In general, in one aspect, the invention relates to a system for transmitting data. The system includes: an input port; an output port; a switch fabric including a primary fabric, an auxiliary fabric, and a controller; a distributor configured to obtain, from the input port, a first data unit, provide the first data unit to the primary fabric, where the primary fabric transmits the first data unit to an aggregator through a first data path in the primary fabric, obtain, from the input port after the first data unit is transmitted to the primary fabric, a second data unit, provide the second data unit to the auxiliary fabric, where the auxiliary fabric transmits the second data unit to the aggregator through the second data path in the auxiliary fabric; a transmission module configured to determine that a congestion threshold associated with the input port is exceeded, and send, in response to determining that the congestion threshold is exceeded, a request to the controller to establish a second data path through the auxiliary fabric; the controller configured to receive the request to establish the second data path, and establish, in response to the request, the second data path through the auxiliary fabric; and the aggregator configured to receive the first data unit from the primary fabric and provide the first data unit to the output port, and receive the second data unit from the auxiliary fabric and provide the second data unit to the output port.

In general, in one aspect, the invention relates to a method of transmitting data through a network device. The method includes obtaining, from an input port, a first data unit, transmitting, through a primary fabric, the first data unit to an output port, determining, after transmitting the first data unit, that the primary fabric is congested, establishing, in response to determining that the primary fabric is congested, a data path in an auxiliary fabric, obtaining, after establishing the data path, a second data unit from the input port, transmitting the second data unit through the data path in the auxiliary fabric, and providing, after transmitting the first data unit, the second data unit to the output port.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to a switch fabric that includes a primary fabric and an auxiliary fabric. Further, embodiments of the invention provide a method and system for reallocating bandwidth in a network device that includes such switch fabric. In general, embodiments of the invention transmit data units through the primary fabric. If congestion is identified within the network device, a data path is established through the auxiliary fabric and one or more data units are transmitted through the data path.

In one or more embodiments of the invention, the switch fabric may be located in or operatively connected to a router, a single-layer switch, a multi-layer switch, a hub, a repeater, or any other device on a network that is configured to transfer packets.

In the following description of FIGS. 1-14, any component described with regard to a figure, in various embodiments of the invention, may be equivalent to one or more like-named components described with regard to any other figure. For example, distributor A (601a) of FIG. 6 may be implemented as distributor (120) of FIG. 1 and auxiliary fabric (520) of FIG. 5 may be implemented as auxiliary fabric (215) of FIG. 2. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Figure 1:
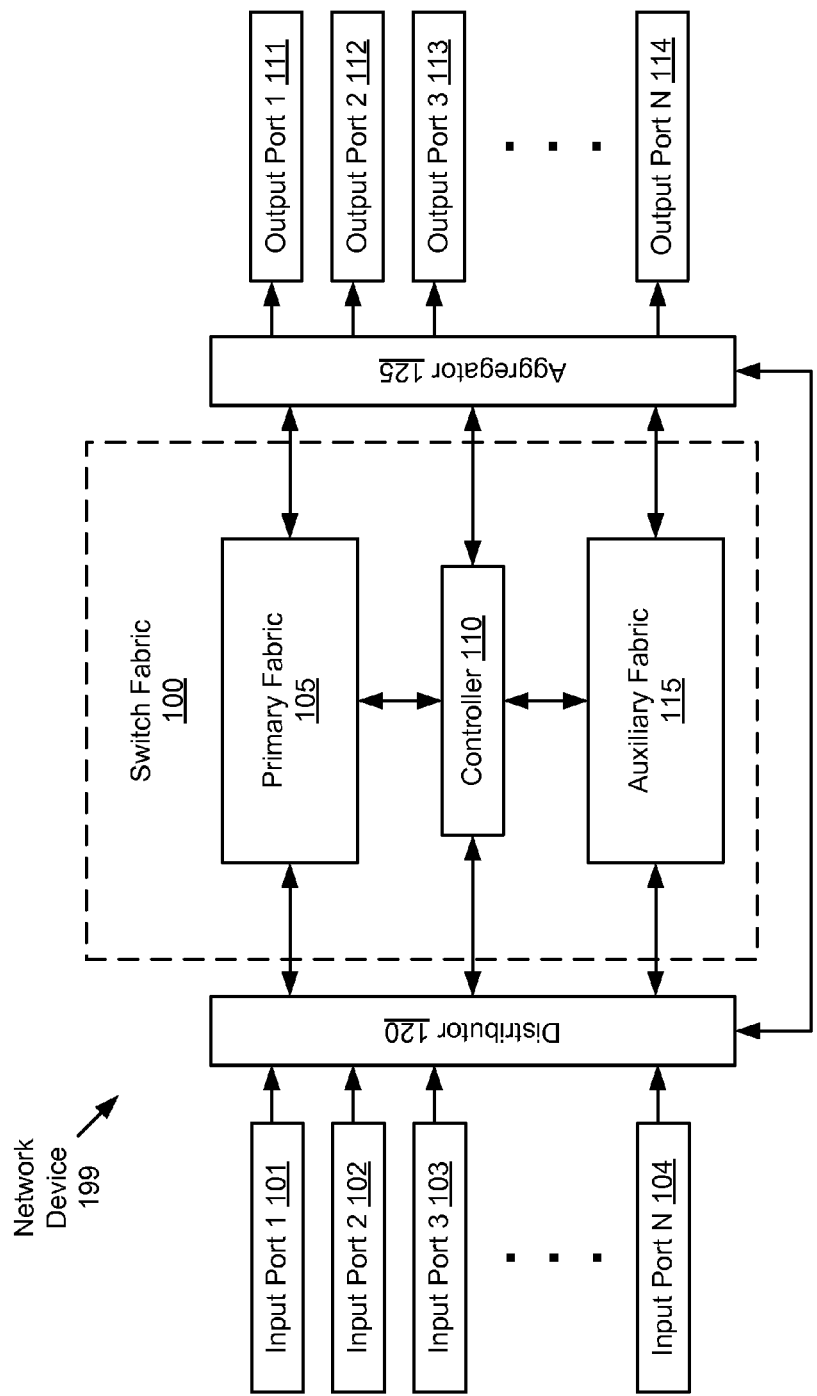
FIGS. 1-9 show schematic diagrams in accordance with various embodiments of the invention.

FIG. 1 shows a network device (199) in accordance with one embodiment of the invention. As shown in FIG. 1, the system has multiple components including a switch fabric (100) that includes a primary fabric (105), an auxiliary fabric (115) and a controller (110), a distributor (120), an aggregator (125), one or more input ports (e.g., input port 1 (101), input port 2 (102), input port 3 (103), and input port N (104)), and one or more output ports (e.g., output port 1 (111), output port 2 (112), output port 3 (113), and output port N (114)). In one or more embodiments of the invention, the components of the network device (199) may be located on separate devices, operatively connected with one another. One or more of the components may also reside within other components. For example, the controller (110) may reside within the distributor (120) or the auxiliary fabric (115), in various embodiments of the invention. Those skilled in the art will appreciate that there may be more than one of each separate component running on the network device (199), as well as any combination of these components within a given embodiment of the invention.

In one or more embodiments of the invention, the network device (199) is a hardware device including functionality to transmit one or more data units (not shown) from an input port (e.g., input port 1 (101)) to an output port (e.g., output port 1 (111)).

In one or more embodiments of the invention, a data unit is a logical unit of data capable of being transmitted across a computer network. Examples of a data unit may include, but are not limited to, a packet, a datagram, a frame, a fragment, and a segment. The data unit may include a control segment and a payload segment. The control segment may be any contiguous or non-contiguous segment of the data unit storing information required for delivery of the data unit to a destination. In one or more embodiments of the invention, the control segment includes data corresponding to one or more layers of the Open Systems Interconnection (OSI) model. For example, the control segment may include data from the transport layer, the network layer, the data link layer, another OSI layer, or any combination thereof. Examples of control data in the control segment may include, but are not limited to, source and destination addresses (e.g., Media Access Control (MAC) or Internet Protocol (IP) address, etc.), connection ID, encryption/error detection codes (e.g., MD5 checksum), Time-to-Live (TTL), sequencing information, or any combination thereof. In one or more embodiments of the invention, the payload segment may include any data whatsoever, and is essentially the cargo of the data unit.

In one or more embodiments of the invention, the primary fabric (105) is a switching device or a network of switching devices. The primary fabric (105) may be configured to transmit one or more data units from the distributor (120) to the aggregator (125). Examples of a primary fabric may include, but are not limited to, a crossbar switch, a crossover switch, a memory switch, and an optical switch (e.g., a bubble-based switch, a liquid crystal switch, an electro-optic switch (LiNbO$_3$), a thermo-optic switch, a semiconductor optical amplifier (SOA) switch, a holographic switch, etc.). Examples of a network of switches may include, but is not limited to, multiple stages of crossbar switches, a Banyan tree, a Clos network, and/or any other architecture connecting one or more inputs to one or more outputs.

In one or more embodiments of the invention, the auxiliary fabric (115) is a switching device or a network of switching devices. The auxiliary fabric (115) may be configured to transmit one or more data units from the distributor (120) to the aggregator (125). Like the primary fabric (105), the auxiliary fabric (115) may include a network of switches such as multiple stages of crossbar switches, a Banyan tree, a Clos network, and/or any combination thereof. In one or more embodiments of the invention, the primary fabric (105) utilizes packet switching while the auxiliary fabric (115) utilizes circuit switching.

The primary fabric (105) and the auxiliary fabric (115) may utilize packet, circuit, or hybrid (packet and circuit) switching technologies, in accordance with various embodiments of the invention. The switch fabric (100) may be implemented as discrete switch chips on a printed circuit board, as a multi-chip module, and/or as a single integrated circuit.

In one or more embodiments of the invention, the distributor (120) is an interface between the input ports (e.g., input port 1 (101), input port 2 (102), input port 3 (103), and input port N (104)) and the switch fabric (100). The distributor (120) may include one or more hardware elements and/or logic required to obtain data units from an input port and provide them to the appropriate entry point of the switch fabric (100). In one or more embodiments of the invention, the distributor (120) is implemented as a demultiplexer configured to obtain input from an external host. In such a scenario, the external host may configure the demultiplexer to connect an appropriate section of the switch fabric to an input port in order to provide one or more data units to the switch fabric (100).

In one or more embodiments of the invention, the distributor (120) includes functionality to obtain one or more data units from one or more input ports (e.g., input port 1 (101)). The distributor (120) may obtain a data unit from a buffer or queue associated with an input port. In one or more embodiments of the invention, the distributor (120) obtains one or more data units from a virtual output queue (VOQ). In one embodiment of the invention, the VOQ is a queue associated with a given input port-output port pair.

In one or more embodiments of the invention, the distributor (120) includes functionality to provide one or more data units obtained from an input port to the primary fabric (105). If congestion is detected within the network device (199), the distributor (120) may be configured provide only a portion of the data units from the input port or VOQ to the primary fabric (105), with the remaining portion of the data units being routed to the auxiliary fabric (115). In one or more embodiments of the invention, during non-congested operation (e.g., when no congestion has been detected within the network device (199)), the distributor is configured to transmit all data units from the input ports to the primary fabric.

In one or more embodiments of the invention, the distributor (120) includes functionality to detect congestion within the network device (199). More specifically, the distributor (120) may include functionality to determine whether a congestion threshold is exceeded. A congestion threshold may be associated with a VOQ, an input port, a buffer within the primary or auxiliary fabric, and/or any combination thereof. Examples of a congestion threshold may include, but are not limited to, a number of packets within one or more VOQs, a number of packets within one or more input ports, a utilization percentage of one or more VOQs, a utilization percentage of one or more input ports, a number of packets or utilization percentage at any point in the primary fabric (105) and/or the auxiliary fabric (115) (e.g., at a buffer), any measurement correlated with the number of packets handled by the network device (199) (or a segment of the network device (199)) and/or any combination thereof.

In one or more embodiments of the invention, the controller (110) includes some or all of the aforementioned functionality to detect congestion within the network device (199). In such embodiments the controller includes the necessary hardware and firmware to obtain information about the flow of data units through the switch fabric (100).

In one example, a congestion threshold is defined as 1000 data units per VOQ. In this example, the distributor (120) includes functionality to identify when the number of elements within a VOQ in the network device exceeds the congestion threshold (i.e., 1000 data units). In another example, a congestion threshold is defined as 500 data units in a buffer within the auxiliary fabric. In one or more embodiments of the invention, in a potentially blocking architecture, the auxiliary fabric (115) may include one or more buffers at potential congestion points. Continuing the example, the controller (110) includes functionality to identify when the number of elements within the buffer exceeds the congestion threshold (i.e., 500 data units).

In one or more embodiments of the invention, the distributor (120) includes functionality to obtain traffic information about the primary fabric (105) and/or the auxiliary fabric (115). Examples of traffic information may include, but are not limited to, congestion, throughput, bandwidth, and data unit loss at various points within the switch fabric (100). The distributor (120) may be configured to obtain this information directly from the fabric(s) and/or from the controller (110), in various embodiments of the invention. For example, the distributor (120) may obtain, from the controller (110), a notification that a congestion threshold corresponding to a buffer within the primary fabric has been exceeded.

In one or more embodiments of the invention, the distributor (120) includes functionality to provide, when congestion is detected, one or more data units to the auxiliary fabric. In response to determining that a congestion threshold is exceeded, the distributor (120) may be configured to provide only a portion of the data units from the input port or VOQ to the auxiliary fabric (115). This portion may include any data units from the input port or VOQ beyond a given percentage or amount (e.g., the congestion threshold) of data units.

When congestion is detected in the network device (199), the distributor (120) may divide data unit(s) between the primary and auxiliary fabrics at random, based on a mathematical function of the throughput or bandwidth, and/or based on one or more common fields in a control segment of the data unit(s). For example, the distributor (120) may be configured to provide data units from a common source or destination (e.g., based on MAC or IP address, connection ID, identification tag, etc.) to the same section of the switch fabric (100) (i.e., the primary fabric (105) or the auxiliary fabric (115)) in order to eliminate or reduce the need for re-ordering. In one or more embodiments of the invention, when maintaining the order of packets is required, the distributor (120) is configured to add a tag to one or more data units based on a common source, destination, and/or other control data. This tag may then be used (e.g., by the aggregator (125)) to re-order the packets prior to routing them to their respective output port(s).

In one or more embodiments of the invention, the aggregator (125) is an interface between the switch fabric (100) and the output ports (i.e., output port 1 (111), output port 2 (112), output port 3 (113), and output port N (114)). The aggregator (125) may include one or more hardware elements and/or logic required to obtain data units from an exit point of the switch fabric (100) and provide them to an appropriate output port. The distributor (120) may be implemented as a multiplexer configured to obtain input from an external host, in accordance with various embodiments of the invention. In such a scenario, the external host may configure the multiplexer to connect an appropriate section of the switch fabric (100) to an output port in order to provide one or more data units to the output port.

In one or more embodiments of the invention, the aggregator (125) may be configured to store one or more data units in a reorder buffer (not shown). The reorder buffer may be any memory device or a portion of one or more memory devices capable of storing two or more data units. In one or more embodiments of the invention, the distributor is configured to track an original order in which the data units are obtained by one or more input ports and to provide this information, directly or indirect (e.g., via tags on data units) to the aggregator. The data units may then be transmitted through the switch fabric (100) in any order. The aggregator (125) may store the data units in the reorder buffer in their order of arrival at the aggregator (after they are transmitted through the switch fabric (100)). In one or more embodiments of the invention, the aggregator (125) is configured to provide the stored data units to one or more output ports in the original order. The data units may be reordered based on a tag in the control segment and/or any other method of transmitting the original order of the data units to the aggregator (125) (e.g., via direct notification from the distributor (120)).

A data path may be any path through the switch fabric (100). A data path may cross between the primary fabric (105) and the auxiliary fabric (115) any number of times. A data path may also refer to any path through a portion of the primary fabric (105) and/or the auxiliary fabric (115). In one or more embodiments of the invention, one or more resources may be allocated within the auxiliary fabric (115) and/or primary fabric (105) in order to establish the data path. Establishing a data path may require a latency period in order to allocate and/or deallocate resources. The data path may refer to a circuit within a circuit switched network, a logical path, a virtual circuit within a packet switched network, and/or any path for transmitting data in any network type (e.g., a hybrid network).

A circuit switched network may be any network which creates a physical circuit connection for each data path through the network. In one or more embodiments of the invention, a setup operation must be performed in order to establish the circuit connection and a teardown operation must be performed in order to deallocate (or otherwise release) physical resources from the data path. In one or more embodiments of the invention, a physical resource utilized in the circuit connection cannot be used in another circuit connection until the circuit connection is released. Even if no actual communication is taking place in an established circuit connection, its physical resources may remain unavailable for usage in other circuit connections. Any component or device involved in performing circuit switching within the switch fabric (100) may be referred to as a circuit switched network component.

A packet switched network may be any network which does not create a dedicated physical circuit connection for each data path through the network. Physical resources in a packet switched network may be shared among any number of data paths. A packet switched network may also modify the flow of data units based on control information obtained from the data units. Thus, data units entering the switched network at the same physical input location may be transmitted through different paths in the network and may have different packet transfer delays. Establishing a data path through a packet switched network may require logical updates based on the aforementioned control information, and may require significantly less setup and teardown latency than a circuit switched network. Any component or device involved in performing packet switching within the switch fabric (100) may be referred to as a packet switched network component.

In one or more embodiments of the invention, the controller (110) includes functionality to establish a data path through the auxiliary fabric (115). The controller (110) may dynamically establish the data path based on a request from the distributor (120) or aggregator (125). Alternatively, the controller (110) may establish the data path in response to determining that a congestion threshold has been exceeded. In establishing the data path, the controller (110) may be configured to allocate dedicated or shared resources within the switch fabric (100) to the data path. The controller (110) may establish the data path within any implementation of the primary fabric (105) or the auxiliary fabric (115) including circuit switched network components and/or packet switched network components. The controller (110) may be configured to continue routing data units through the primary fabric (105) during a latency period associated with establishing the data path. In one or more embodiments of the invention, the controller (110) and/or distributor (120) are configured to modify the congestion threshold based on the latency period. For example, the distributor (120) may decrease the congestion threshold by a number of data units or percentage points based on the expected latency period. In such a scenario, the latency period is obtained from the controller (110) and may vary based on the particular implementation of the switch fabric (100) and the data path that the controller (110) is establishing.

In one or more embodiments of the invention, the controller (110) includes functionality to perform a teardown of a data path in the switch fabric. The teardown may involve de-allocating dedicated or shared resources within the switch fabric (100) and may be associated with a latency period. The teardown may apply to any implementation of the primary fabric (105) or the auxiliary fabric (115) and may include circuit switched network components and/or packet switched network components.

In one or more embodiments of the invention, the distributor (120) includes functionality to detect that a disconnect threshold is met. In one or more embodiments of the invention, the disconnect threshold is set when a data path that uses at least a portion of the auxiliary fabric (115) is established. Thus, the distributor (120) may, in response to detecting that a disconnect threshold is met, request a teardown of one or more previously established data paths. A disconnect threshold may be associated with a VOQ, an input port, a buffer within the primary or auxiliary fabric, and/or any combination thereof. Examples of a disconnect threshold may include, but are not limited to, a number of packets within one or more VOQs, a number of packets within one or more input ports, a utilization percentage of one or more VOQs, a utilization percentage of one or more input ports, a number of packets or utilization percentage at any point in the primary fabric (105) and/or the auxiliary fabric (115) (e.g., at a buffer), any measurement correlated with traffic information about the network device (199) (or a segment of the network device (199)) and/or any combination thereof. In one or more embodiments of the invention, the controller (110) includes some or all of the aforementioned functionality to detect congestion within the network device (199).

In one or more embodiments of the invention, the distributor (120) includes functionality to prevent or reduce congestion within the auxiliary fabric (115) by limiting the number of data paths within the auxiliary fabric (115). The distributor (120) may limit congestion based on a predefined maximum number of data paths within the auxiliary fabric and/or based on traffic information obtained from the auxiliary fabric (115).

In one or more embodiments of the invention, the network device (199) may include two or more primary fabrics and/or two or more auxiliary fabrics. In such scenarios, the controller (110) may be configured to utilize the auxiliary fabrics in a predefined order and/or according to a predefined algorithm. For example, the auxiliary fabrics may be utilized in a cascading order or may be utilized in an algorithm designed to achieve equal utilization of each auxiliary fabric.

In one or more embodiments of the invention, the auxiliary fabric (115) is overlayed with the primary fabric (105) in order to create a composite fabric (not shown). In the composite fabric, physical resources may be over-provisioned such that a larger crossbar switch is used at each stage. For example, a ten input crossbar may be used for n=8 nominal inputs of each crossbar switch. In this example, multiple aggregators may be placed locally at the inputs of each crossbar. The bandwidth of each connection between the crossbars may be over-provisioned as well (e.g., 2× the bandwidth of each crossbar port) to handle any excess bandwidth at the output of the aggregators. Continuing the example, congestion is reduced by dynamically routing data units through unused ports of the crossbars with the local distributor and aggregating the data units when connecting to other crossbars.

Figure 2:
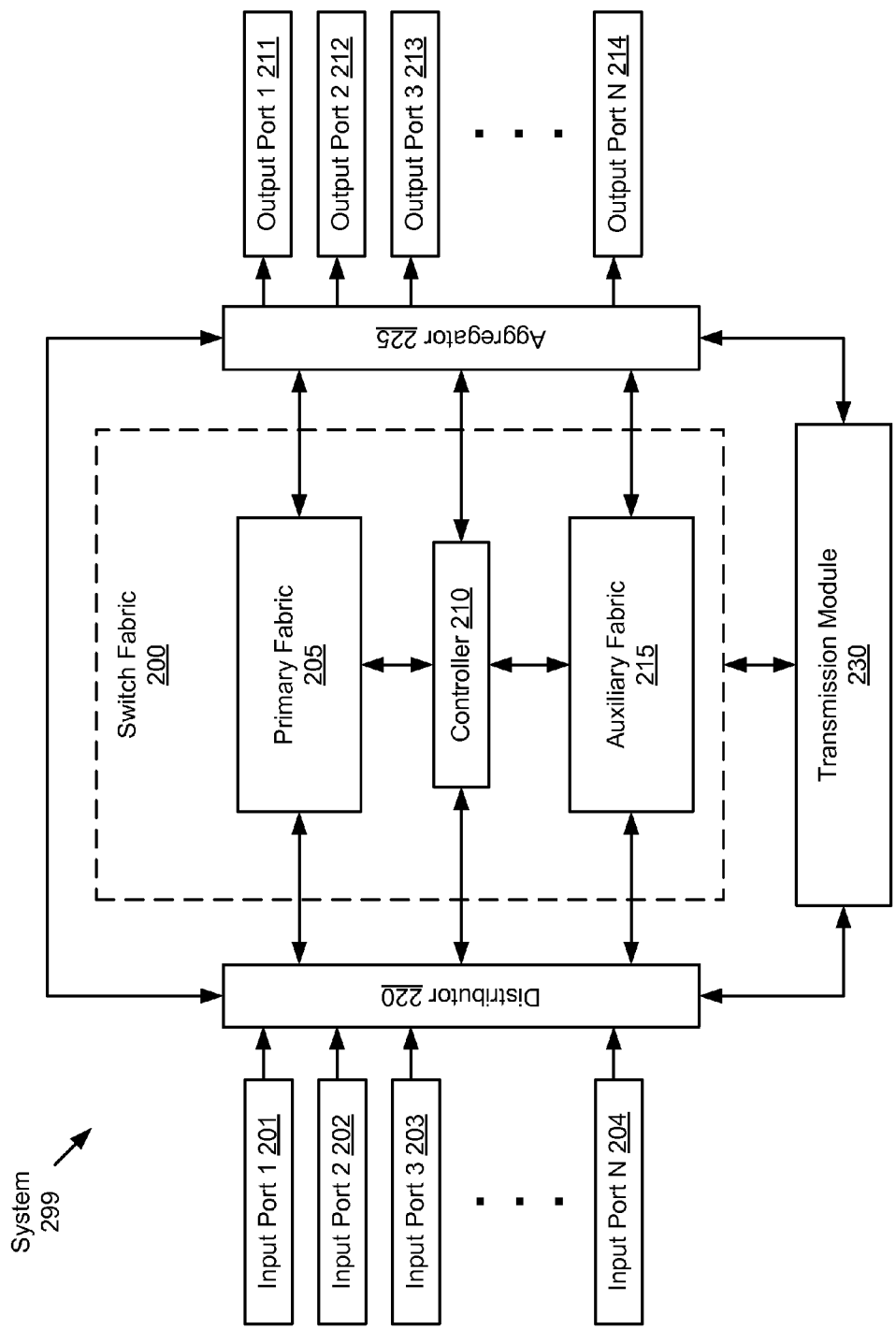

FIG. 2 shows a system (299) in accordance with one embodiment of the invention. As shown in FIG. 2, the system has multiple components including a switch fabric (200) that includes a primary fabric (205) a controller (210) and an auxiliary fabric (215), a distributor (220), an aggregator (225), a transmission module (230), a set of input ports (e.g., input port 1 (201), input port 2 (202), input port 3 (203), and input port N (204)), and a set of output ports (e.g., output port 1 (211), output port 2 (212), output port 3 (213), and output port N (214)). In one or more embodiments of the invention, the components of the system (299) may be located on separate devices, operatively connected with one another. One or more of the components may also reside within other components. For example, the controller (210) may reside within the transmission module (230) or the distributor (220), in various embodiments of the invention. Those skilled in the art will appreciate that there may be more than one of each separate component running on the system (299), as well as any combination of these components within a given embodiment of the invention.

In one or more embodiments of the invention, the transmission module (230) may be implemented as a hardware device, software, firmware, and/or a combination thereof. The transmission module (230) may reside on a network device along with one or more other components of the system (299) or may reside on an external computing device operatively connected to the system (299).

In one or more embodiments of the invention, the transmission module (230) includes functionality to determine the intended output port of a data unit based on data obtained from one or more external data sources (e.g., network devices, hosts, etc.).

In one or more embodiments of the invention, the transmission module (230) includes functionality to obtain traffic information about the switch fabric (200). The transmission module (230) may obtain traffic information from the controller (210), directly from the primary/auxiliary fabrics, from components within the primary or auxiliary fabrics (e.g., intermediary distributor (510b) of FIG. 5, discussed below), or any combination thereof. Traffic information may include loss rate, throughput, latency, performance information (e.g., average transmission time per data unit), and/or bandwidth data relating to any segment of the switch fabric.

In one or more embodiments of the invention, the transmission module (230) includes functionality to detect congestion in the system (299). The transmission module (230) may determine that a congestion threshold is exceeded, and/or may determine that any predefined congestion criteria is met, in accordance with various embodiments of the invention. In various embodiments of the invention, with regard to detecting congestion in the system (299), the transmission module may include some or all of the functionality of the distributor (120) of FIG. 1 (above).

In one or more embodiments of the invention, the transmission module (230) includes functionality to send instructions to the distributor (220) based on traffic information obtained from the switch fabric (200). The transmission module (230) may instruct the distributor (220) to divert packets away from congested portions of the primary or auxiliary fabric in response to detecting congestion. In one or more embodiments of the invention, the transmission module (230) includes all or part of the functionality of the distributor (120) discussed with regard to FIG. 1 (above).

In one or more embodiments of the invention, the transmission module (230) includes functionality to send instructions to the aggregator (225) based on traffic information obtained from the switch fabric (200). The transmission module (230) may be configured to maintain packet ordering information and may send packet ordering information to the aggregator (225). The transmission module (230) may instruct the aggregator to re-order packets to the order in which they were received by the input port(s).

In one or more embodiments of the invention, the transmission module (230) includes all or part of the functionality of the controller (110) discussed with regard to FIG. 1 (above). Thus, the transmission module (230) may be configured to establish a data path through the auxiliary fabric (215) or to instruct the controller (210) to establish a data path between two points in the switch fabric (200) based on traffic information.

Figure 3:
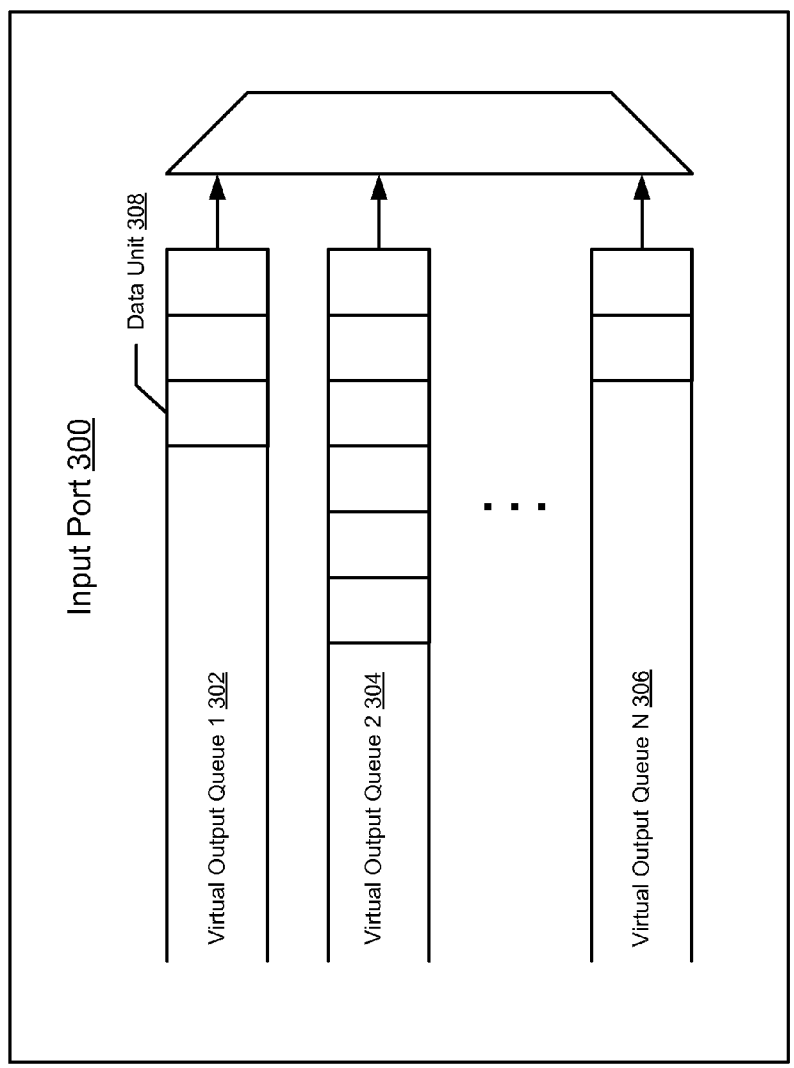

FIG. 3 shows an input port (300) in accordance with one embodiment of the invention. As shown in FIG. 3, the system has multiple components including multiple data units (e.g., data unit (308)) and multiple virtual output queues (VOQs) (i.e., virtual output queue 1 (302), virtual output queue 2 (304), and virtual output queue N (306)). In one or more embodiments of the invention, the components of the input port (300) may be located on separate devices connected by a network (e.g. the Internet), with wired and/or wireless segments. Those skilled in the art will appreciate that there may be more than one of each separate component within the input port (300), as well as any combination of these components within a given embodiment of the invention.

In one or more embodiments of the invention, the input port (300) is a physical interface configured to receive one or more data units. The input port (300) may reside on a network device (e.g., network device (199) of FIG. 1, discussed above) or on a component of a network device.

In one or more embodiments of the invention, a virtual output queue is a buffer or other physical device configured to store data units. Alternatively, in one or more embodiments of the invention, the virtual output queue (e.g., virtual output queue 1 (302)) is a logical entity corresponding to the input port (300). In this implementation, the VOQ may store references to data units instead of the data units themselves. In various embodiments of the invention, the virtual output queue may reside within the input port (300), on a memory of a network device, and/or in an external host module or device (e.g., a transmission module (230) or distributor (220) described with regard to FIG. 2, discussed above).

In one or more embodiments of the invention, each virtual output queue of the input port (300) corresponds to a different output port (not shown). In a network device, each input port (300) may include a separate VOQ for each output port present on the network device, in one or more embodiments of the invention.

In one or more embodiments of the invention, the input port (300) may be configured to extract control information from a control segment of a data unit and provide such information to the distributor (120 in FIG. 1). The extraction of the control information and subsequent communication of the control information to the distributor (120 in FIG. 1) may be achieved using, for example, a transceiver, media access controller, classifier, and/or buffer queues, in accordance with various embodiments of the invention.

Figure 4:
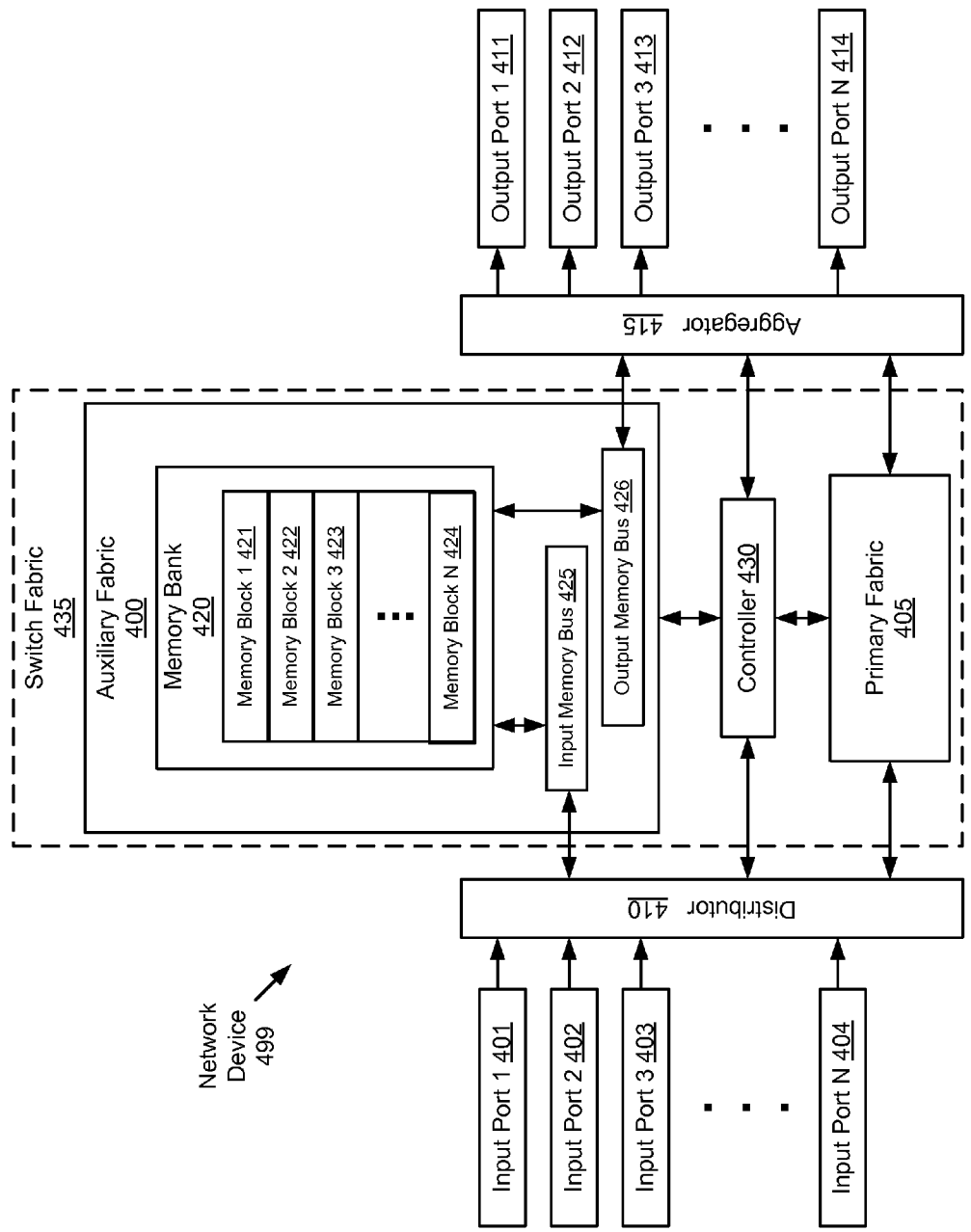

FIG. 4 shows a network device (499) in accordance with one embodiment of the invention. As shown in FIG. 4, the network has multiple components including a switch fabric (435) that includes a primary fabric (405) and an auxiliary fabric (400), and a distributor (410), an aggregator (415), a controller (430), a memory bank (420), an input memory bus (425), an output memory bus (426), a set of memory blocks (e.g., memory block 1 (421), memory block 2 (422), memory block 3 (423), and memory block N (424)), a set of input ports (e.g., input port 1 (401), input port 2 (402), input port 3 (403), and input port N (404)), and a set of output ports (e.g., output port 1 (411), output port 2 (412), output port 3 (413), and output port N (414)). In one or more embodiments of the invention, the components of the network device (499) may be located on separate devices, operatively connected with one another. One or more of the components may also reside within other components. For example, the controller (430) may reside within the distributor (410) or the auxiliary fabric (400), in various embodiments of the invention. Those skilled in the art will appreciate that there may be more than one of each separate component running on the network device (499), as well as any combination of these components within a given embodiment of the invention.

In one or more embodiments of the invention, the memory bank (420) is a shared memory device or a portion of a memory device configured to store one or more data units (not shown) within one or more memory blocks (e.g., memory block 1 (421)). The memory device may be operatively connected to the input memory bus (425) and the output memory bus (426). In one or more embodiments of the invention, the memory bank (420) includes functionality to receive one or more data units from the distributor (410) via the input bus and to send one or more data units to the aggregator (415) via the output bus (426).

In one or more embodiments of the invention, the input memory bus (425) is an interface between the distributor (410) and the memory bank (420). The input memory bus (425) may be implemented as any computer bus or physical device capable of transmitting data units to the memory bank.

In one or more embodiments of the invention, the output memory bus (426) is an interface between the memory bank (420) and the aggregator (415). The output memory bus (426), like the input memory bus (425), may be implemented as any computer bus or physical device capable of transmitting data units to the memory bank.

In one or more embodiments of the invention, the controller (430) includes functionality to establish a data path through the input memory bus (425), the memory bank (420), and the output memory bus (426). In accordance with various embodiments of the invention, the input memory bus (425) may have a fixed bandwidth and may be capable of supporting a fixed number of connections to input ports (e.g., input port 1 (401)). Similarly, in accordance with various embodiments of the invention, the output memory bus (426) may have a fixed bandwidth and may be capable of supporting a fixed number of connections to output ports (e.g., output port 1 (411)). In one embodiment of the invention, in order to establish a data path through the auxiliary fabric (400), access to the buses must be delegated by the distributor (410) and the aggregator (415).

In one or more embodiments of the invention, in order to establish a data path, the controller (430) includes functionality to grant an input port access to the input memory bus (425). The distributor (410) may identify or receive a memory address pointer referencing a memory block designated for the data path. In one or more embodiments of the invention, the distributor (410) creates a mapping between the input port and the memory block, to be used during the life of the data path. Thus, while maintaining access to the input memory bus (425), the input port is capable of transmitting, via the distributor (410), data units to be stored in the referenced memory block.

In one or more embodiments of the invention, in order to establish a data path, the controller (430) includes functionality to grant an output port access to the output memory bus (426). The aggregator (415) may identify or receive the memory address pointer referencing the memory block designated for the data path. In one or more embodiments of the invention, the aggregator (415) identifies a mapping between the output port and the memory block, to be used during the life of the data path. This mapping may be created by the distributor (410) and may be communicated to the aggregator in order to establish the circuit. Thus, while maintaining access to the output memory bus (426), the output port is capable of receiving, via the aggregator (415), data units from the referenced memory block. Alternatively, each memory block in the memory bank maps to a single input port, output port, and/or VOQ. In such implementations, it may not be necessary to create and maintain the memory address pointer each time a data path is established. In one or more embodiments of the invention, granting access to the input memory bus (425) and the output memory bus (426) is handled by the distributor (410) and the aggregator (415), respectively.

In one or more embodiments of the invention, the controller (430) includes functionality to, upon detecting that a disconnect threshold is met, perform a teardown of the data path. The controller (430) may revoke access to the input memory bus (425) from the input port associated with the data path. Similarly, the controller (430) may revoke access to the output memory bus (426) from the output port associated with the data path. In one or more embodiments of the invention, controller (430) is configured to clear and/or deallocate the associated memory block and/or any corresponding memory address pointers.

In one or more embodiments of the invention, the distributor (410) begins writing into the input memory bus (425) while an old data path is being disconnected in a teardown operation. The overlap may reduce the switching latency to one cycle of the system clock.

Figure 5:
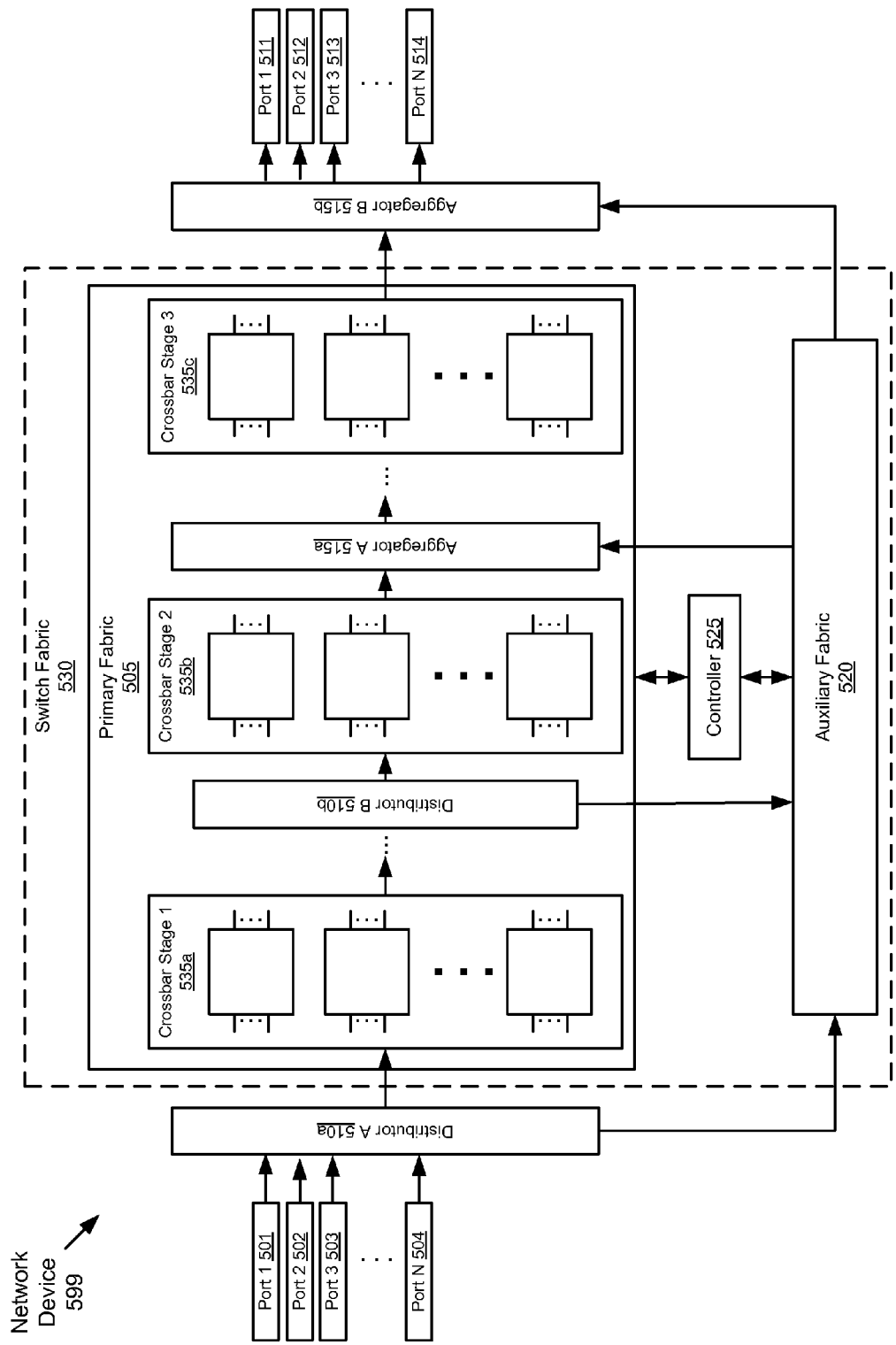

FIG. 5 shows a network device (599) in accordance with one embodiment of the invention. As shown in FIG. 5, the system has multiple components including a switch fabric (530) that includes a primary fabric (505), an auxiliary fabric (520), a set of crossbar stages (e.g., crossbar stage 1 (535a), crossbar stage 2 (535b), crossbar stage 3 (535c)), a controller (525), a set of distributors (e.g., distributor A (510a) and distributor B (510b)), a set of aggregators (e.g., aggregator A (515a) and aggregator B (515b)), a set of input ports (e.g., port 1 (501), port 2 (502), port 3 (503), and port N (504)), and a set of output ports (e.g., port 5 (511), port 6 (512), port 7 (513), and port M (514)). In one or more embodiments of the invention, the components of the network device (599) may be located on separate devices, operatively connected with one another. One or more of the components may also reside within other components. For example, the controller (525) may reside within distributor A (510a) or the auxiliary fabric (520), in various embodiments of the invention. Those skilled in the art will appreciate that there may be more than one of each separate component running on the network device (599), as well as any combination of these components within a given embodiment of the invention.

In one or more embodiments of the invention, the distributor B (510b) is an intermediary distributor within the primary fabric. Distributor B (510b) may be an interface between two or more crossbar stages (or switch networks) of the primary fabric (505) and the auxiliary fabric (520). In one or more embodiments of the invention, distributor B (510b) is configured to determine that crossbar stage 2 (535b) is congested. Distributor B (510b) may monitor and compare traffic information with one or more congestion thresholds associated with crossbar stage 2 (535b) (e.g., a buffer) in order to identify congestion. In response to detecting that the crossbar stage (or a section of the primary fabric) is congested, distributor B (510b) may be configured to request creation of a new data path through the auxiliary fabric (520). Alternatively, distributor B may request modification of an existing data path traveling through the congested section in the primary fabric in order to circumvent the congested section. In one or more embodiments of the invention, distributor B (510b) is configured to transmit only a portion of the data packets through the new or modified data path (e.g., in order to partially relieve congestion at crossbar stage 2 (535b)). In one or more embodiments of the invention, distributor B (510b) is configured to request that the controller (525) create and/or modify the data path.

In one or more embodiments of the invention, distributor B (510b) is configured to provide data units to the auxiliary fabric (520) and to a receiving crossbar stage 2 (535b) from a sending crossbar stage. In this way, an intermediary distributor (e.g., distributor B (510b)) may control access to a receiving section of the primary fabric (505) by handling concurrency and resource sharing when two or more data paths diverge within the switch fabric (530).

In one or more embodiments of the invention, aggregator A (515a) is an intermediary aggregator within the primary fabric (505). Aggregator A (515a) may be an interface between two or more switches or switching devices of the primary fabric (505) and the auxiliary fabric (520). Aggregator A (515a) may be configured to provide data units to a receiving crossbar stage from a sending crossbar stage 2 (535b) as well as the auxiliary fabric (520). In this way, aggregator A (515a) may control access to the receiving crossbar stage by handling concurrency and resource sharing when two or more data paths combine within the switch fabric (530).

In one or more embodiments of the invention, the controller (525) includes functionality to modify a data path based on traffic information about the switch fabric (530) and/or based on an instruction received from an external or internal host device (e.g., distributor A (510a)). Alternatively, all aforementioned logic described with regard to distributor A (510a) and/or distributor B (510b) may reside within the controller, in one or more embodiments of the invention. In this way, any distributors and/or aggregators within the system may be implemented as interfaces and/or switching devices controlled by the controller (525) or an external host device.

In accordance with various embodiments of the invention, the primary fabric (505) and/or the auxiliary fabric (520) may include any number of intermediary distributors and aggregators designed to provide alternate paths throughout the switch fabric (530). Thus, in various embodiments of the invention, a data path may cross between the primary fabric (505) and the auxiliary fabric (520) any number of times.

Figure 6:
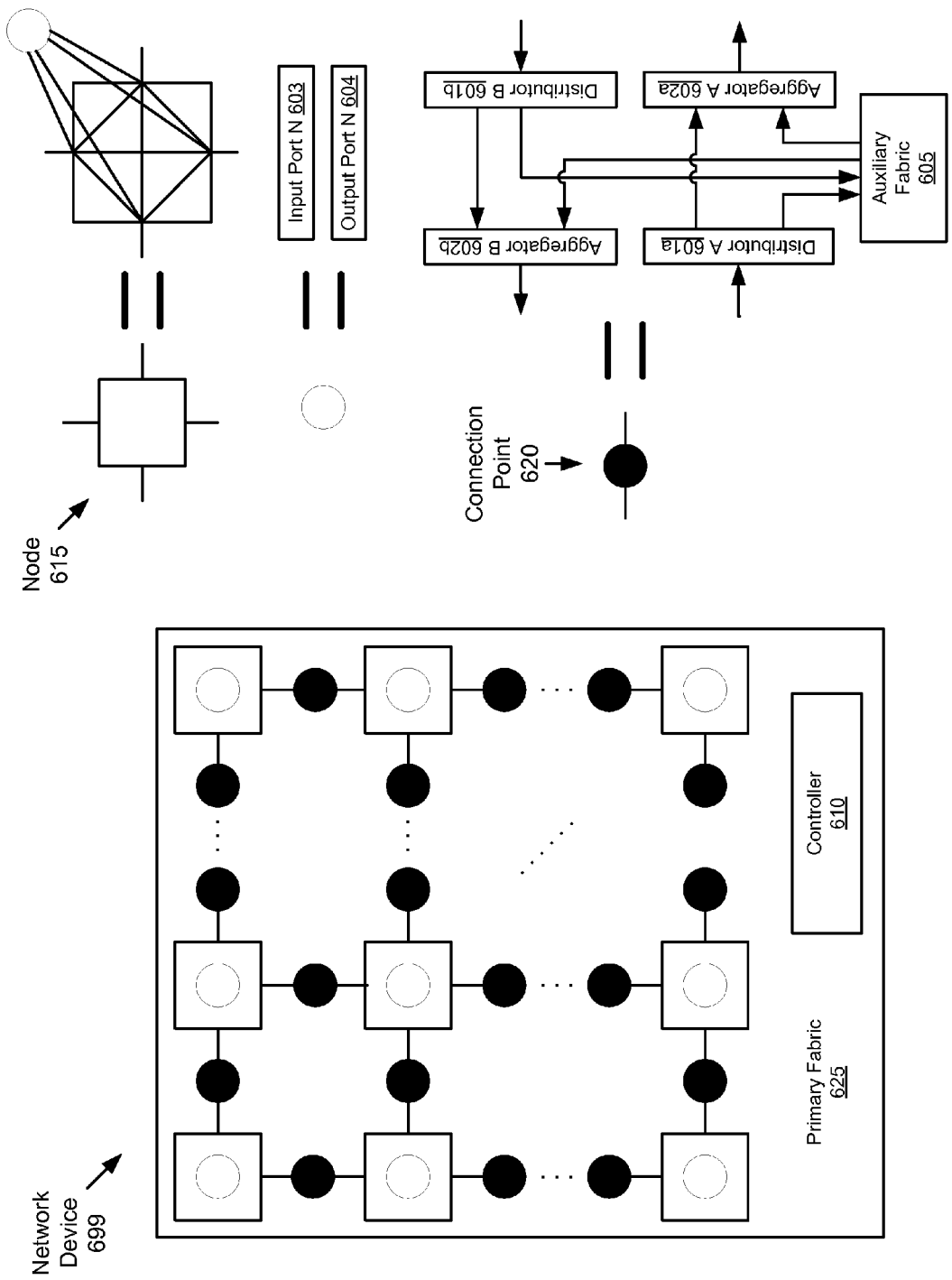

FIG. 6 shows a network device (699) in accordance with one embodiment of the invention. As shown in FIG. 6, the system has multiple components including a node (615), a connection point (620), a primary fabric (625), an auxiliary fabric (605), a controller (610), a distributor A (601a), distributor B (601b), an aggregator A (602a), an aggregator B (602b), an input port N (603), and an output port N (604). In one or more embodiments of the invention, the components of the network device (699) may be located on separate devices, operatively connected with one another. One or more of the components may also reside within other components. For example, the controller (610) may reside within the distributor A (610a) and distributor B (610b) or the auxiliary fabric (605), in various embodiments of the invention. Those skilled in the art will appreciate that there may be more than one of each separate component running on the network device (699), as well as any combination of these components within a given embodiment of the invention.

In one or more embodiments of the invention, the primary fabric (625) is a Cartesian mesh including a set of nodes (e.g., node (615)). Each node of the mesh may include a connection to an input port (e.g., input port N (603)) and an output port (e.g., output port N (604)).

In one or more embodiments of the invention, the nodes of the primary fabric (625) are connected by a set of connection points (e.g., connection point (620)). The connection point (620) may include a distributor A (601a), a distributor B (601b), an aggregator A (602a), and an aggregator B (602b). In one or more embodiments of the invention, distributor A (601a) and distributor B (601b) are interfaces between an incoming node of the Cartesian mesh to: (1) another node of the Cartesian mesh (via an aggregator) and (2) the auxiliary fabric (605).

In one or more embodiments of the invention, the distributors and/or aggregators are configured to receive traffic information from the primary fabric (625) and/or the auxiliary fabric (605). Based on the traffic information, a distributor (e.g., distributor A (601a)) may determine that a congestion threshold associated with the connection point is exceeded. In response to determining that the congestion point is exceeded, the distributor within the connection point (620) may request a data path to be established within the auxiliary fabric (605) in order to transmit at least a portion of the data units passing through the connection point (620) through the data path. This data path may continue through the auxiliary fabric (605) or may switch between the fabrics any number of times based on determinations made by distributors at every connection point. In one or more embodiments of the invention, the auxiliary fabric also contains a Cartesian mesh of nodes and connection points and includes the same or similar functionality.

In one or more embodiments of the invention, the distributors are configured to obtain traffic information from the controller (610). The controller may monitor the fabrics and transmit traffic information to requesting entities or devices (internal or external). In one or more embodiments of the invention, the controller (610) or an external host (e.g., a transmission module) is configured to determine that congestion exists at one or more points throughout the Cartesian mesh based on traffic information received from the fabrics. Thus, according to various embodiments of the invention, the logic for determining congestion may reside in one or more devices internal and/or external to the network device (699).

In one or more embodiments of the invention, the controller (610) and/or the distributors are configured to implement one or more algorithms at the various connection points of the system in order to avoid or reduce the possibility of deadlock. For example, an algorithm may require that North/West inputs of a node can only route to South/East outputs and vice-versa.

In one or more embodiments of the invention, the primary fabric (625) includes one or more queues at one or more of its nodes. Thus, the network device (699) may be able to reduce the possibility of dropping a data unit by storing one or more data units in a queue during periods of high traffic. Congestion thresholds may be based on the capacity of such queues.

Figure 7:
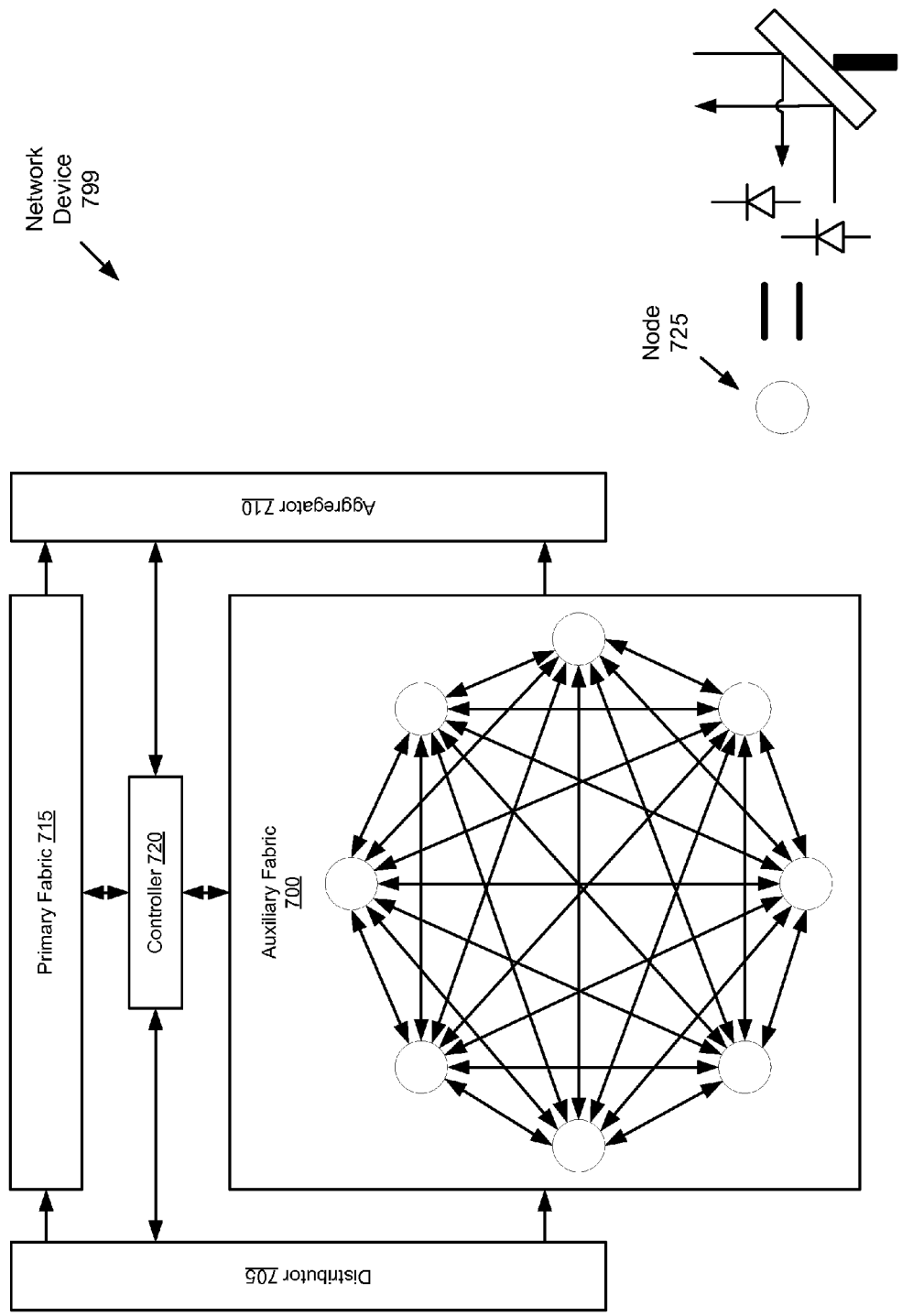

FIG. 7 shows a network device (799) in accordance with one embodiment of the invention. As shown in FIG. 7, the system has multiple components including a controller (720), a primary fabric (715), an auxiliary fabric (700), a distributor (705), and an aggregator (710), and a set of nodes (e.g., node (725)). In one or more embodiments of the invention, the components of the network device (799) may be located on separate devices, operatively connected with one another. One or more of the components may also reside within other components. For example, the controller (720) may reside within the distributor (705) or the auxiliary fabric (700), in various embodiments of the invention. Those skilled in the art will appreciate that there may be more than one of each separate component running on the network device (799), as well as any combination of these components within a given embodiment of the invention.

In one or more embodiments of the invention, the auxiliary fabric (700) includes an optical switch network. Each node (e.g., node (725)) in the optical switch network may include one or more mechanical switching elements (e.g., a mirror). The mechanical switching element may be configured to send and/or receive an optical beam from another mechanical switching element of the auxiliary fabric. The network device (799) may utilize wave-division multiplexing (WDM) in order to establish multiple data paths through a single optical beam, in one or more embodiments of the invention.

In one or more embodiments of the invention, the controller (720) is configured to receive a request to establish a data path through the auxiliary fabric (700). The controller (720) may, in response to receiving the request, identify a set of nodes (e.g., node (725)) which are required to create the data path. The controller (720) may then send instructions to position one or more mechanical mirrors in a first node of the set of nodes to face a mechanical mirror in a second node of the set of nodes. The controller (720) may position mechanical mirrors at each node until a data path connecting the nodes is formed through the optical network. Each node along the data path may transmit an optical beam to another node, until the collection of one or more beams creates the data path between the distributor (705) and the aggregator (710).

In one or more embodiments of the invention, when WDM is utilized, the latency period associated with establishing a data path may be reduced if one or more sections of the data path require only switching a wavelength within an established optical beam (without repositioning of a mechanical mirror).

Figure 8:
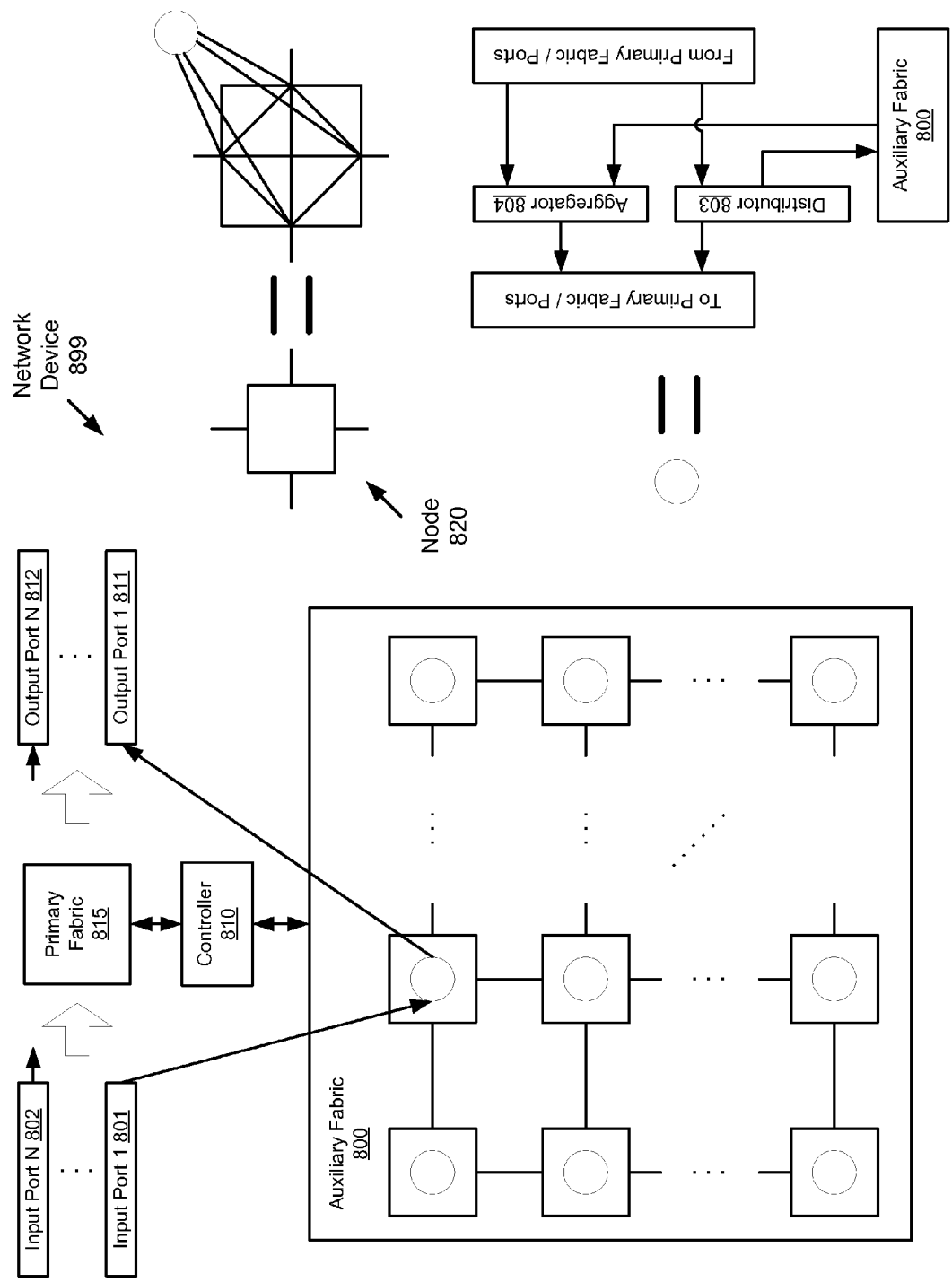

FIG. 8 shows a network device (899) in accordance with one embodiment of the invention. As shown in FIG. 8, the system has multiple components including a controller (810), a primary fabric (815), an auxiliary fabric (800), a distributor (803), an aggregator (804), a set of input ports (e.g., input port 1 (801) and input port N (804)), and a set of output ports (e.g., output port 1 (811) and output port N (812)). In one or more embodiments of the invention, the components of the network device (899) may be located on separate devices, operatively connected with one another. One or more of the components may also reside within other components. For example, the controller (810) may reside within the distributor (803) or the auxiliary fabric (800), in various embodiments of the invention. Those skilled in the art will appreciate that there may be more than one of each separate component running on the network device (899), as well as any combination of these components within a given embodiment of the invention.

In one or more embodiments of the invention, the network device (899) includes a Cartesian mesh having a set of nodes. Each node (e.g., node (820)) of the mesh may include an outgoing connection and an incoming connection from the primary fabric (815) and the auxiliary fabric (800). Each node may also include a local distributor (803) and a local aggregator (804). The node may be implemented as a 5-way fully connected switch. As shown in FIG. 8, each node of the mesh may include an entry point (via an input node) and an exit point (via an output node) of the fabric.

In one or more embodiments of the invention, the distributor (803) determines whether a data unit is directed to the primary fabric (815) or the auxiliary fabric (800). The aggregator (804) may be configured to properly re-order the data units from the primary fabric (815) with those of the auxiliary fabric (800). In one or more embodiments of the invention, the auxiliary fabric (800) is configured to forward data units along the mesh to the desired target node through a sequence of switches. The aggregator (804) is configured to pull the data unit arriving at the destination node out of the mesh. The distributor (803) and aggregator (804) are configured to utilize a routing algorithm at each node of the mesh in order to avoid deadlock.

In one or more embodiments of the invention, the controller (810) is configured to establish a data path through the fabrics. The controller (810) is configured to configure each switch at the various nodes along a data path to receive data units from a preceding switch or port on the data path. Once a data path is established, all subsequent data units follow the established data path until a data unit indicating an end of the connection is encountered or until the controller (810) de-allocates the switches and resources involved in the data path in a teardown operation.

Figure 9:
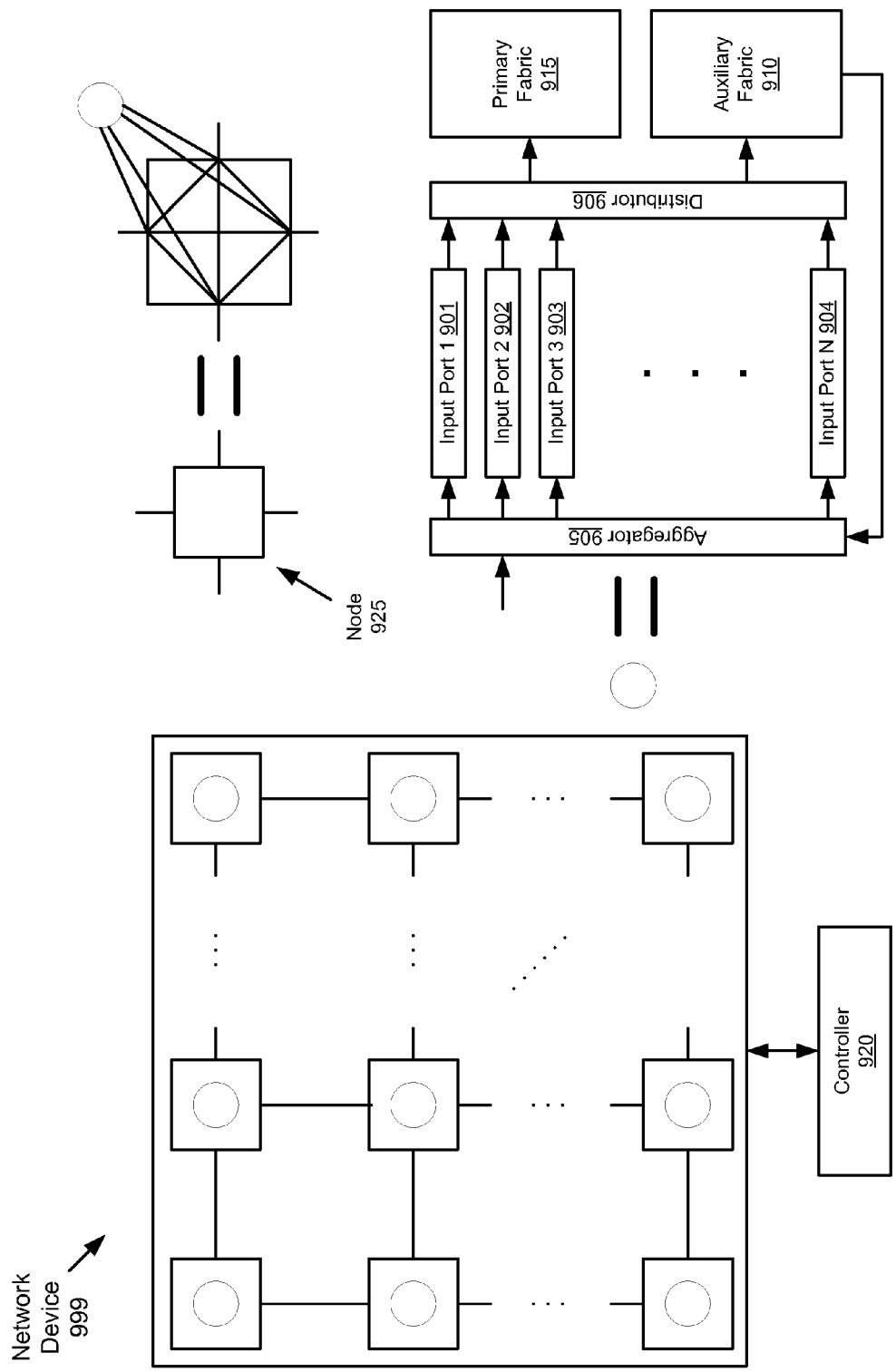

FIG. 9 shows a network device (999) in accordance with one embodiment of the invention. As shown in FIG. 9, the system has multiple components including a controller (920), a primary fabric (915), an auxiliary fabric (910), an aggregator (905), a distributor (906), and a set of input ports (e.g., input port 1 (901), input port 2 (902), input port 3 (903), and input port N (904)). In one or more embodiments of the invention, the components of the network device (999) may be located on separate devices, operatively connected with one another. One or more of the components may also reside within other components. For example, the controller (920) may reside within the auxiliary fabric (910), in various embodiments of the invention. Those skilled in the art will appreciate that there may be more than one of each separate component running on the network device (999), as well as any combination of these components within a given embodiment of the invention.

In one or more embodiments of the invention, the network device (999) includes a Cartesian mesh having a set of nodes and a controller (920). Each node (e.g., node (925)) of the mesh may include a set of input ports (i.e., input port 1 (901), input port 2 (902), input port 3 (903), and input port N (904)), an aggregator (905), a distributor (906), and connections to the primary fabric (915) and the auxiliary fabric (910).

In one or more embodiments of the invention, the distributor (906) is configured to establish a data path from one input port to another input port. For example, if one port connected to the mesh is highly congested while another port is not heavily utilized, the distributor (906) may redirect data units from the congested input port to the uncongested port (through the data path). In this example, the aggregator (905) obtains the data unit from the auxiliary fabric (910) and provides it to the uncongested port. The distributor (906) may be configured to assign specific congestion thresholds for each port or section of the fabric(s). In one or more embodiments of the invention, the data path is established by one or more switching devices or networks outside of the fabric. As with all descriptions of the controller and distributor, some or all of the logic in the distributor may be carried out by the controller and vice-versa.

Figure 10:
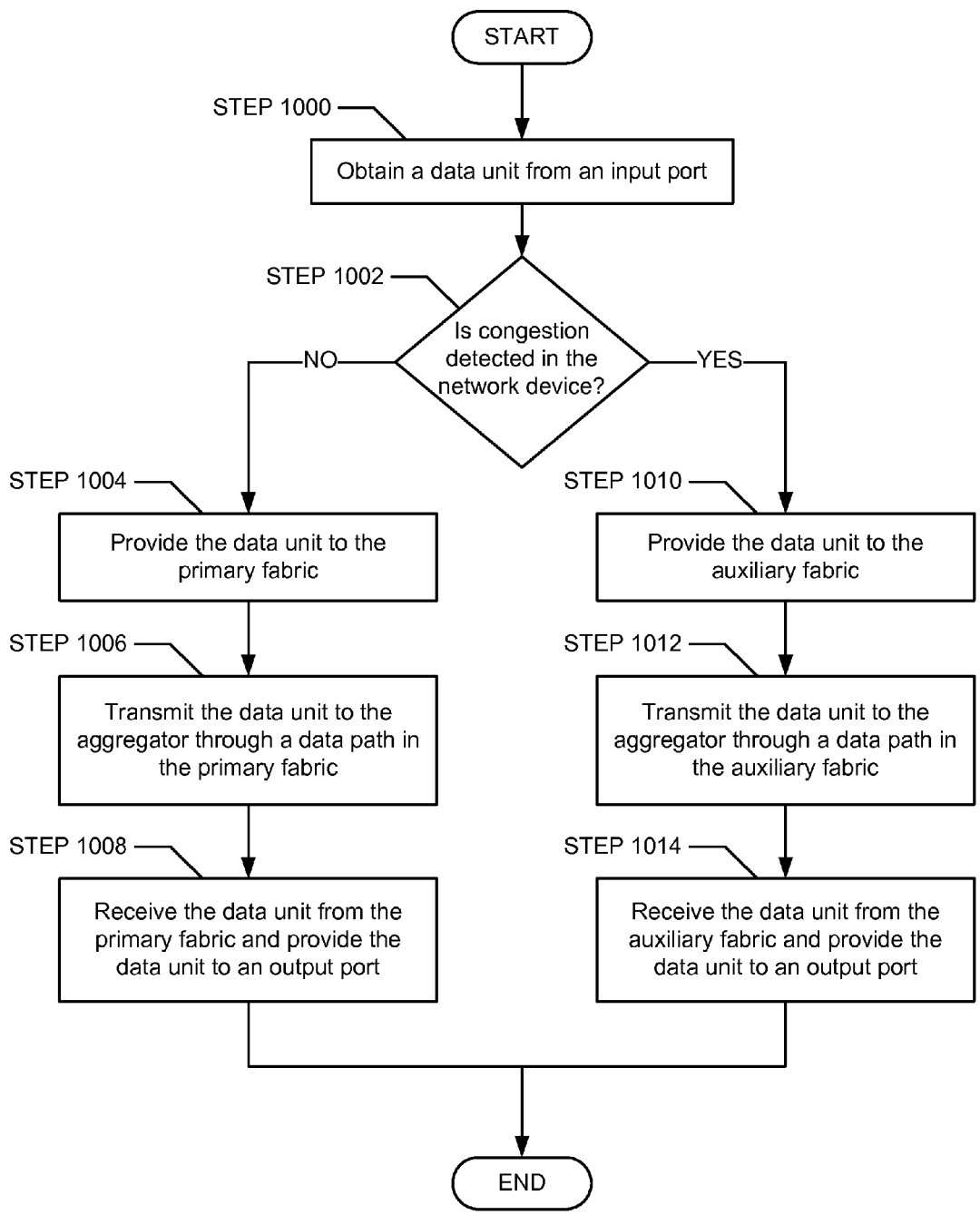
FIGS. 10 and 11 show flowcharts in accordance with various embodiments of the invention.

FIG. 10 shows a flowchart of a method for transmitting data units based on congestion in a network device. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 10 should not be construed as limiting the scope of the invention.

In STEP 1000 a data unit is obtained from an input port. The data may be obtained by a distributor (e.g., distributor (120) of FIG. 1, discussed above) based on a VOQ associated with an input port and output port pair.

In STEP 1002 a determination is made about whether congestion is detected in a network device. The distributor may detect congestion based on a congestion threshold associated with an input port or VOQ. In one or more embodiments of the invention, STEP 1002 may be performed asynchronously or in any predefined order or time (e.g., at any point in the flowchart of FIG. 10). In one embodiment of the invention, the distributor obtains information from a controller in the switch fabric and uses this information to determine whether there is congestion in the switch fabric. Alternatively, a controller in the switch fabric may make the determination that the switch fabric (or portions thereof) are congested. If congestion is detected in the network device (or in portions thereof), the process proceeds to STEP 1010. Alternatively, the process proceeds to STEP 1004.

In STEP 1004 the data unit is provided to the primary fabric. The data unit may be transmitted from the input port to the primary fabric over an interface. In one or more embodiments of the invention, layer 2 and/or layer 3 OSI model control information is utilized to pass the data unit to an appropriate section of the primary fabric. Control information may be obtained and/or utilized in any step of the process described by FIG. 10. For example, the control information may be used to identify an output port and the data unit or a reference to the data unit may be placed into a VOQ corresponding to the input port and output port. This may be performed prior to, during, or after STEP 1000 in accordance with various embodiments of the invention. After obtaining the data unit from the input port, the control information and the aforementioned congestion information may be used to identify a potential data path through an appropriate section of the primary fabric.

In STEP 1006 the data unit is transmitted through a data path in the primary fabric. The data path may have been dynamically established in response to a request to transmit the data unit and/or may be pre-established (i.e., not requiring a "setup" latency). Transmitting the data unit may require a controller associated with the primary fabric to configure the primary fabric based on the source and destination of the data unit and/or control information from a control segment of the data unit.

In STEP 1008 the data unit is received from the primary fabric and provided to an output port. The data unit may be received by an interface (e.g., aggregator (125) of FIG. 1, discussed above) between the primary fabric and an output port. The data unit may be provided to the output port based on data obtained from another module of the network device (e.g., VOQ information from a distributor) or may be a based on a predetermined mapping between a section of the primary fabric and the port.

In STEP 1010 the data unit is provided to the auxiliary fabric. The data unit may be transmitted from the input port to the auxiliary fabric over an interface. In one or more embodiments of the invention, layer 2 and/or layer 3 control information corresponding to the OSI model is extracted from the data unit by an interface connected to the input port. After obtaining the data unit from the input port, the control information and the aforementioned congestion information may be used to identify a potential data path through an appropriate section of the auxiliary fabric.

In STEP 1012 the data unit is transmitted through a data path in the auxiliary fabric (or at least through a portion of the auxiliary fabric). The data path may have been dynamically established in response to a request to transmit the data unit and/or may be pre-established (i.e., not requiring a "setup" latency). Transmitting the data unit may require a controller associated with the primary fabric to configure the primary fabric and/or auxiliary fabric based on the source and destination of the data unit and/or control information from a control segment of the data unit.

In STEP 1014 the data unit is provided to an output port. The data unit may be received from the auxiliary fabric after being transmitted through the data path. The data unit may be received by an interface (e.g., aggregator (125) of FIG. 1, discussed above) between the auxiliary fabric and the output port. Thus, in one or more embodiments of the invention, one or more switches within the interface are configured to provide the data unit to the appropriate output port based on control information obtained from the control segment of the data unit.

Figure 11:
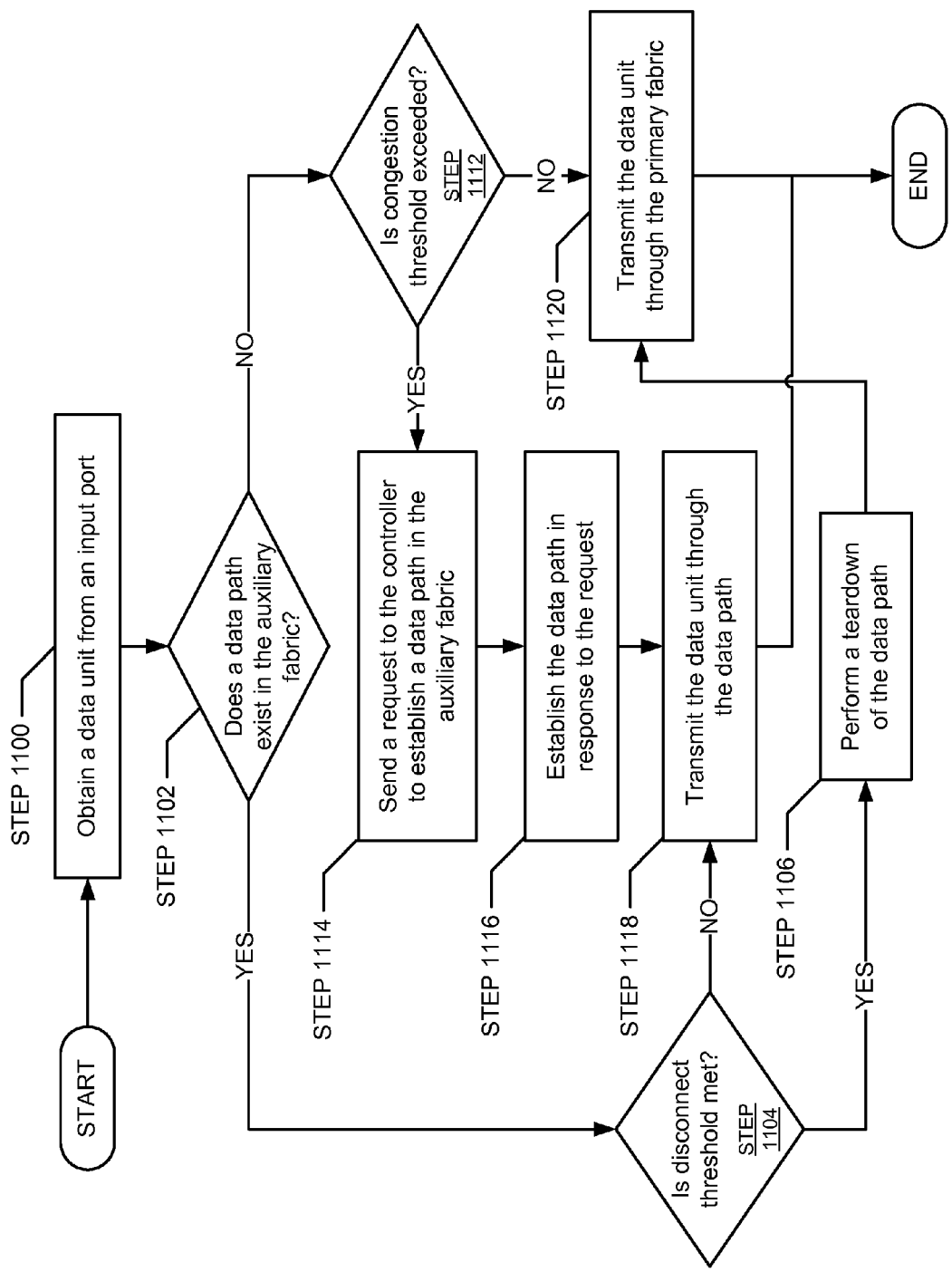

FIG. 11 shows a flowchart of a method for transmitting data units based on congestion in a network device. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 11 should not be construed as limiting the scope of the invention.

In STEP 1100 a data unit is obtained from an input port. The data may be obtained by an interface between the input port and a switch fabric (e.g., distributor (120) of FIG. 1, discussed above) based on a VOQ associated with an input port and output port pair, in accordance with various embodiments of the invention.

In STEP 1102 a determination is made about whether a data path exists (i.e., a data path that was previously established) in the auxiliary fabric. In one or more embodiments of the invention, the data path corresponds to the VOQ. Alternatively, any data path capable of transmitting the data unit may be identified. If no such data path exists within the auxiliary fabric, the process proceeds to STEP 1112. If such a data path is identified, the process proceeds to STEP 1104. In one or more embodiments of the invention, if a data path exists within the auxiliary fabric, the packets from the corresponding input port or VOQ are divided between the data path and a primary fabric. Thus, determining whether the data path exists may not be necessary for each data unit or may not be necessary once an interface between the input ports and the fabric is configured.

In STEP 1104 a determination is made about a disconnect threshold associated with the data path(s) is met. If the disconnect threshold is met, the process proceeds to STEP 1106. If the disconnect threshold is not met, the process proceeds to STEP 1118. STEP 1104 along with STEP 1112 may be performed at any predetermined time and may be performed asynchronously, in various embodiments of the invention.

In STEP 1106 a teardown of the data path is performed. If the data path was established within switch fabric implementing packet switching, then the teardown may require little or no latency and may involve sending one or more instructions to a controller in order to modify one or more switching devices within the switch fabric. If the data path was established within a switch fabric implementing circuit switching, the teardown may require a significant latency period associated with de-allocating resources from the input port, output port, and/or any shared resources within the switch fabric.

In STEP 1120 the data unit is transmitted through the primary fabric. The data unit may be queued within the primary fabric if congestion is present, and/or may be transmitted between the primary fabric and the auxiliary fabric in accordance with various embodiments of the invention.

In STEP 1118 the data unit is transmitted through the data path in the auxiliary fabric. The data path travels from an input of the auxiliary fabric to an output of the auxiliary fabric. Along the data path, the data unit may be queued within the primary fabric if congestion is present, and/or may be transmitted between the primary fabric and the auxiliary fabric in accordance with various embodiments of the invention.

In STEP 1112 a determination is made about whether a congestion threshold is exceeded. If it is determined that a congestion threshold is exceeded, the process proceeds to STEP 1114. Otherwise, the process proceeds to STEP 1120. If it is determined that a congestion threshold is exceeded, the data unit may, in one or more embodiments of the invention, be transmitted through the primary fabric while STEPS 1114 and 1116 are performed. Thus, one or more subsequent data units from the same VOQ may be submitted through the data path after the latency period associated with establishing the data path. Alternatively, in one or more embodiments of the invention, the data unit may be queued with other data units in the same set or VOQ until the data path is established.

In STEP 1114 a request is sent to the controller to establish a data path in the auxiliary fabric. The request may be transmitted to an on-chip controller or a module operatively connected to the auxiliary fabric. In one or more embodiments of the invention, a series of requests may be made to separate switching elements within the auxiliary fabric in order to create the data path.

In STEP 1116 the data path is established in the auxiliary fabric in response to the request. A set of hardware switches within the auxiliary fabric may be modified in order to establish the data path. One or more shared resources, such as a shared memory bank or one or more buses, may also be allocated in establishing the data path. More than one data path may exist simultaneously and one or more data paths may cross at one or more points in the switch fabric, in one or more embodiments of the invention. Establishing and performing a teardown of one or more data paths may occur concurrently while continuing to transmit data units through the primary fabric and the auxiliary fabric, in various embodiments of the invention.

The following section describes various examples of the invention. The examples are included to aid in the understanding of the invention but are not intended to limit the scope of the invention.

Figure 12:
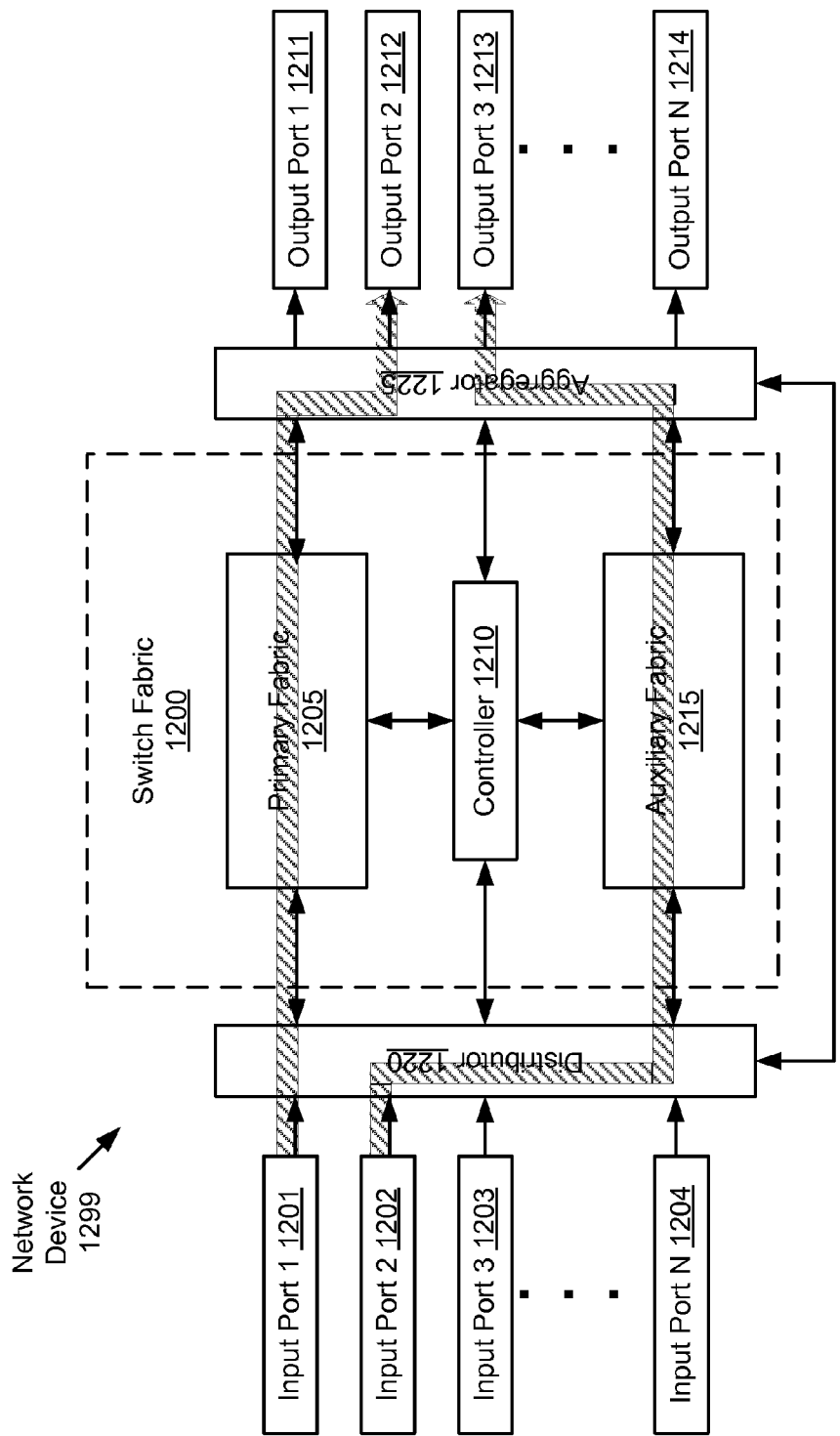
FIGS. 12-14 show example data paths in accordance with various embodiments of the invention.

In the example depicted by FIG. 12, two example routes through a network device are shown. In this example, the route connecting input port 1 (1201) with output port 2 (1212) goes through the primary fabric (1205), while the route connecting input port 2 (1202) with output port 3 (1213) travels through the auxiliary fabric (1215). Each of the aforementioned routes also depicts a corresponding data path through the auxiliary or primary fabric.

Figure 13:
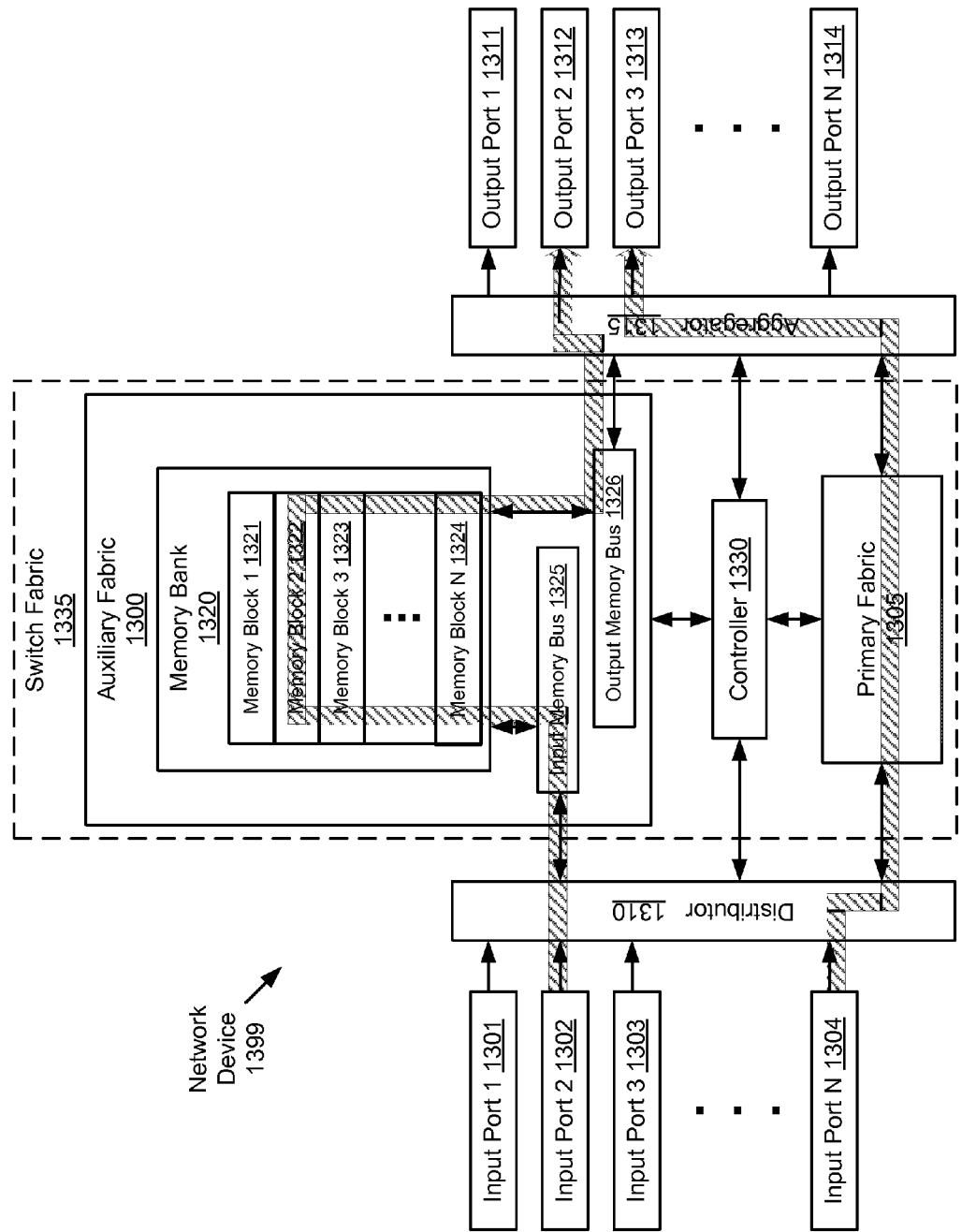

In the example depicted by FIG. 13, two example routes through a network device are shown. In this example, the route connecting input port 2 (1302) with output port 2 (1312) (hereinafter "route 1") goes through a data path within the auxiliary fabric (1300) and the route connecting input port N (1304) with output port 3 (1313) travels through a data path in the primary fabric (1305).

Continuing the example, route 1 is established after detecting that a congestion threshold associated with input 2 (1302) is exceeded. The congestion threshold is a limit of 499 data units in the VOQ connecting input 2 (1312) and output 2 (1312). Upon receiving the $500^{th}$ data unit, the distributor (1310) sends a request to the controller (1330) to establish a data path through the auxiliary fabric (1300). In response to the request, the controller (1330) begins allocating resources within the auxiliary fabric (1300) for a new data path. In the meantime, during the latency period of establishing the data path, data units continue to be queued in the VOQ. The size of the corresponding buffer in the input port may be selected to be greater than the congestion threshold such that no data units are lost during the latency period.

Continuing the example, the controller (1330) grants the distributor (1310) access to the input memory bus (1325) and grants the aggregator (1315) access to the output memory bus (1326). The controller also grants access to memory block 2 (1322), via the input and output memory buses, to the distributor (1310) and aggregator (1315). Memory block 2 (1322) is identified based on a mapping to the VOQ (i.e., input port 2 and output port 2).

Continuing the example, once the data path is established through the auxiliary fabric (1300), the distributor obtains a data unit from input port 2 (1302) and writes the data unit to memory block 3 (1323) via the input memory bus (1325). The distributor (1310) then notifies the aggregator (1315) that the data unit is available in the memory block. In response to the notification, the aggregator (1315) reads the data unit from memory block 3 (1323) via the output memory bus (1326) and provides the data unit the output port 2 (1312).

Figure 14:
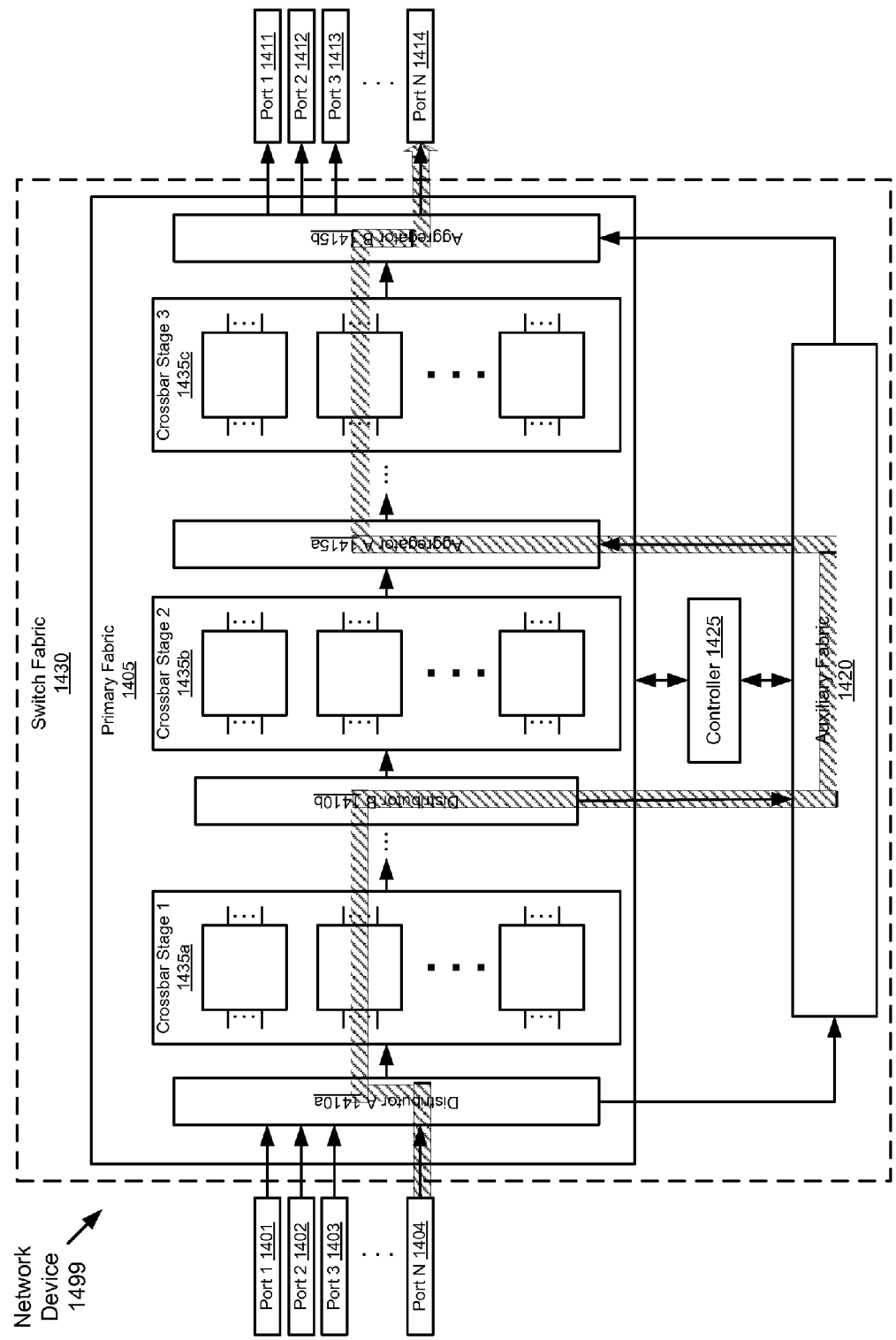

In the example depicted by FIG. 14, an example route through a network device is shown. In the figure, the route is displayed connecting input port N (1404) with output port N (1414). The route depicts data paths through both the primary and auxiliary fabrics.

Continuing the example, intermediary distributor B (1410*b*) detects that a congestion threshold associated with a buffer inside of the primary fabric (1405) is exceeded. In response to this detection, distributor B (1410*b*) sends a request to the controller (1425) to establish a data path in the auxiliary circuit. The controller (1425) then establishes the data path through only a portion of the auxiliary fabric (1420). After establishing the data path, distributor B begins transmitting 50% of the data units it receives through the data path in the auxiliary fabric (1420), while transmitting the remaining 50% (not shown) through the primary fabric (1405). Once a data unit is provided to the auxiliary fabric (1420), the auxiliary fabric transmits the data unit along the established data path until it reaches an exit point of the auxiliary fabric (1420). At this point, the intermediary aggregator A (1415a) obtains the data unit and, according to a predefined algorithm, re-integrates the data unit with the primary fabric (1405). The predefined algorithm ensures that resources within the primary fabric (1405) are shared between the various sources of incoming data units (without conflict). The primary fabric (1405) then transmits the data unit to aggregator B (1415b) which provides the data unit to output port N (1414).

Embodiments of the invention may be implemented on virtually any type of network device or system. For example, as shown in FIG. 1, in one or more embodiments of the invention, one or more elements of the network device (199) may be located at a remote location and connected to the other elements over a network. Further, embodiments of the invention may be implemented on a distributed system having a plurality of nodes, where each portion of the invention (e.g., distributor (120), controller (110), aggregator (125)) may be located on a different node within the distributed system. In one embodiment of the invention, the node corresponds to a network device. Alternatively, the node may correspond to a module or computer system. Further, software instructions in the form of computer readable program code to perform embodiments of the invention may be stored, temporarily or permanently, on a non-transitory computer readable storage medium, such as a random access memory (RAM), flash memory, compact disc (CD), a diskette, a tape, memory, or any other tangible computer readable storage device.

By dynamically allocating data units between a primary fabric and an auxiliary fabric of a network device, embodiments of the invention enable the reduction of traffic through congested areas of the network device. This may reduce the loss rate of the network device. Further, by dynamically bypassing congestion in a network device, embodiments of the invention may achieve increased throughput with a smaller number of physical components. It may also be possible to reduce latency, reduce cost, reduce bi-section bandwidth, improve reliability, and/or increase efficiency of a network device or system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
  a switch fabric comprising a primary fabric, an auxiliary fabric, and a controller, the auxiliary fabric including an input memory bus, an output memory bus, and a memory bank;
  an aggregator; and
  a distributor, wherein the primary fabric and the auxiliary fabric are operable to transfer data units from the distributor to the aggregator, wherein the primary fabric and the auxiliary fabric have separate switching devices for transferring the data units, wherein the distributor is configured to:
    obtain a first data unit from an input port;
    send the first data unit to the aggregator through the primary fabric, wherein the primary fabric transmits the first data unit through a first data path;
    determine if the primary fabric is congested;
    send, if the primary fabric is congested, a request to the controller to establish a second data path through the auxiliary fabric, wherein establishing the second data path includes:
      designating a memory location in the memory bank;
      creating a first mapping between the input port and the memory location; and
      creating a second mapping between an output port and the memory location;
    identify the memory location using the first mapping;
    transmit a second data unit over the input memory bus to the memory location, the memory bank configured to store the second data unit; and
    send the second data unit to the aggregator through the auxiliary fabric when the second data path is established;
  wherein the controller is configured to establish, in response to the request, the second data path in the auxiliary fabric; and
  wherein the aggregator is further configured to:
    obtain, using the output memory bus, the second data unit from the memory location;
    identify the output port corresponding to the memory location using the second mapping; and
    provide the first data unit and the second data unit to the output port.

2. The network device of claim 1, wherein the aggregator is further configured to:
  receive a plurality of data units in an arrival order;
  store the plurality of data units in a reorder buffer associated with the aggregator;
  determine an original order of the plurality of data units; and
  provide the plurality of data units from the reorder buffer to the output port in the original order.

3. The network device of claim 1, wherein the primary fabric comprises:
  a logical mesh comprising a plurality of nodes connected by a plurality of junction points, wherein each junction point of the plurality of junction points comprises:
    an intermediary distributor and an intermediary aggregator connected to the auxiliary fabric.

4. The network device of claim 1, wherein the auxiliary fabric comprises a plurality of optical switches, and wherein the second data path is established using at least one of the plurality of optical switches.

5. The network device of claim 1, wherein the controller is further configured to:
  monitor the primary fabric to collect traffic information; and
  provide the traffic information to the distributor to determine if the primary fabric is congested based on the traffic information.

6. The network device of claim 1, wherein the primary fabric comprises an intermediary distributor and an intermediary aggregator configured to:
  identify a third data unit in the primary fabric; and
  circumvent a portion of the primary fabric by transmitting the third data unit through a portion of the auxiliary fabric.

7. The network device of claim 1, wherein the primary fabric performs packet switching and the auxiliary fabric performs circuit switching.

8. The network device of claim 1, wherein the primary fabric comprises:

a logical mesh connecting a plurality of nodes, wherein each node of the plurality of nodes is connected to the auxiliary fabric.

9. A network device comprising:
an input port;
an output port;
a switch fabric comprising a primary fabric, an auxiliary fabric, and a controller, wherein the auxiliary fabric comprises an input memory bus, an output memory bus, and a memory bank; and
a distributor configured to:
  obtain, from the input port, a first data unit;
  provide the first data unit to the primary fabric, wherein the primary fabric transmits the first data unit to an aggregator through a first data path in the primary fabric;
  after the first data unit is transmitted to the primary fabric:
    determine that the primary fabric is congested;
    send, in response to determining that the primary fabric is congested, a request to the controller to establish a second data path through the auxiliary fabric, wherein establishing the second data path comprises:
      designating a memory location in the memory bank;
      creating a first mapping between the input port and the memory location; and
      creating a second mapping between the output port and the memory location;
    obtain, from the input port and after sending the request, a second data unit;
    identify the memory location using the first mapping; and
    transmit the second data unit over the input memory bus to the memory location wherein the memory bank is configured to store the second data unit;
    provide the second data unit to the auxiliary fabric, wherein the auxiliary fabric transmits the second data unit to the aggregator through the second data path in the auxiliary fabric;
  the controller configured to:
    receive the request to establish the second data path; and
    establish, in response to the request, the second data path in the auxiliary fabric; and
  the aggregator configured to:
    receive the first data unit from the primary fabric and provide the first data unit to the output port; and
    obtain, using the output memory bus from the auxiliary fabric, the second data unit from the memory location;
    identify the output port corresponding to the memory location using the second mapping; and
    provide the second data unit to the output port.

10. A method for transmitting data through a network device, comprising:
obtaining, from an input port, a first data unit;
transmitting, through a primary fabric, the first data unit to an output port;
determining, after transmitting the first data unit, that the primary fabric is congested;
establishing, the primary fabric is congested, a data path in an auxiliary fabric, wherein the auxiliary fabric comprises an input memory bus, an output memory bus, and a memory bank, and wherein establishing the data path further comprises:
  designating a memory location in the memory bank;
  creating a first mapping between the input port and the memory location; and
  creating a second mapping between the output port and the memory location;
obtaining, after establishing the data path, a second data unit from the input port;
transmitting the second data unit through the data path in the auxiliary fabric, wherein the memory bank is configured to store the second data unit, wherein transmitting the second data unit through the data path in the auxiliary fabric further comprises:
  transmitting, based on the first mapping, the second data unit over the input memory bus to the memory location; and
  obtaining, based on the second mapping, the second data unit from the memory location over the output memory bus; and
providing, after transmitting the first data unit, the second data unit to the output port.

11. The method of claim 10, further comprising:
monitoring the primary fabric to collect primary fabric traffic information, wherein the determining if the primary fabric is congested is based on the primary fabric traffic information.

12. A system for transmitting data, comprising:
a plurality of input ports;
a plurality of output ports;
a switch fabric comprising a primary fabric, an auxiliary fabric, and a controller, wherein the auxiliary fabric comprises an input memory bus, an output memory bus, and a memory bank;
an aggregator;
a transmission module; and
a distributor, wherein the primary fabric and the auxiliary fabric are operable to transfer data units from the distributor to the aggregator, wherein the primary fabric and the auxiliary fabric have separate switching devices for transferring the data units, wherein the distributor is configured to:
  obtain a first data unit from an input port;
  send the first data unit to the aggregator through the primary fabric, wherein the primary fabric transmits the first data unit through a first data path; and
  send a second data unit to the aggregator through the auxiliary fabric when congestion is determined, wherein the auxiliary fabric transmits the second data unit through a second data path in the auxiliary fabric, the memory bank configured to store the second data unit, wherein sending the second data unit further comprises:
    identify a memory location using the first mapping; and
    transmit the second data unit over the input memory bus to the memory location;
wherein the transmission module is configured to determine if the primary fabric is congested; wherein the controller is configured to establish the second data path through the auxiliary fabric when congestion is determined, wherein establishing the second data path comprises:
  designating a memory location in the memory bank;
  creating a first mapping between the input port and the memory location; and
  creating a second mapping between the output port and the memory location;
wherein the aggregator is configured to:
  provide the first data unit and the second data unit to an output port from the plurality of output ports, wherein providing the second data unit further includes obtaining, using the output memory bus, the second data unit from the memory location;

identifying the output port corresponding to the memory location using the second mapping; and providing the second data unit to the output port.

13. The system of claim 12, wherein the aggregator is further configured to:

receive a plurality of data units in an arrival order;

store the plurality of data units in a reorder buffer associated with the aggregator;

determine an original order of the plurality of data units; and provide the plurality of data units from the reorder buffer to the output port in the original order.

14. The system of claim 12, wherein the controller is further configured to:

monitor the primary fabric to collect traffic information from the primary fabric;

provide the traffic information from the primary fabric to the transmission module;

monitor the auxiliary fabric to collect traffic information from the auxiliary fabric; and provide the traffic information from the auxiliary fabric to the distributor, wherein the transmission module uses the traffic information from the primary fabric to determine whether the primary fabric is congested, and wherein the transmission module uses the traffic information from the auxiliary fabric to determine the second data path.

* * * * *